United States Patent
Brandmaier et al.

(10) Patent No.: US 10,121,204 B1
(45) Date of Patent: *Nov. 6, 2018

(54) AUTOMATED ACCIDENT DETECTION, FAULT ATTRIBUTION, AND CLAIMS PROCESSING

(71) Applicant: Allstate Insurance Company, Northbrook, IL (US)

(72) Inventors: Jennifer A. Brandmaier, Chicago, IL (US); James Gillespie, Belfast (IE); Stephen Hughes, Belfast (IE); Daniel Koza, Hinsdale, IL (US); William Loo, Arlington Heights, IL (US); Francis Lowry, Clogher (IE)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/313,052

(22) Filed: Jun. 24, 2014

Related U.S. Application Data

(63) Continuation of application No. 13/791,338, filed on Mar. 8, 2013, now Pat. No. 8,799,034.

(51) Int. Cl.
*G06Q 40/08* (2012.01)

(52) U.S. Cl.
CPC .................... *G06Q 40/08* (2013.01)

(58) Field of Classification Search
CPC ............ G06F 7/00; G06F 19/00; G06F 40/00; G06Q 30/00; G06Q 40/00; G06Q 40/08; B60T 7/12
See application file for complete search history.

(56) References Cited

U.S. PATENT DOCUMENTS

| 4,638,289 A | 1/1987 | Zottnik |
| 5,450,329 A | 9/1995 | Tanner |

(Continued)

FOREIGN PATENT DOCUMENTS

| AU | 2002301438 B2 | 9/2006 |
| AU | 2007200869 A1 | 3/2007 |

(Continued)

OTHER PUBLICATIONS

"Using Smartphones to Detect Car Accidents and Provide Situational Awareness to Emergency Responders." Mobile Wireless Middleware, Operating Systems, and Applications, pp. 29-42. Jul. 2010.

(Continued)

*Primary Examiner* — Muriel S Tinkler
(74) *Attorney, Agent, or Firm* — Banner & Witcoff, Ltd.

(57) ABSTRACT

A communication module may receive communications from a vehicle. A collision detection module may determine that a collision has occurred at a vehicle based on one or more of the communications received from a vehicle. A participant identification module may identify one or more participants involved in the collision based on one or more communications received from the vehicle. A fault determination module may identify one of the participants as the at-fault participant based on a comparison of a fault determination ruleset to vehicle telematics data included in one or more of the communications received from the vehicle. A claims processing module may determine whether to file an insurance claim associated with one of the participants based on the estimated repair cost.

20 Claims, 12 Drawing Sheets

(56) References Cited

U.S. PATENT DOCUMENTS

| | | |
|---|---|---|
| 5,742,699 A | 4/1998 | Adkins et al. |
| 5,950,169 A | 9/1999 | Borghesi et al. |
| 6,027,415 A | 2/2000 | Takeda |
| 6,060,989 A | 5/2000 | Gehlot |
| 6,061,610 A | 5/2000 | Boer |
| 6,076,028 A | 6/2000 | Donnelly et al. |
| 6,141,611 A | 10/2000 | Mackey et al. |
| 6,211,777 B1 | 4/2001 | Greenwood et al. |
| 6,246,933 B1 * | 6/2001 | Bague .................. G07C 5/085 340/438 |
| 6,262,657 B1 | 7/2001 | Okuda et al. |
| 6,295,492 B1 | 9/2001 | Lang et al. |
| 6,330,499 B1 | 12/2001 | Chou et al. |
| 6,472,982 B2 | 10/2002 | Eida et al. |
| 6,509,868 B2 | 1/2003 | Flick |
| 6,594,579 B1 | 7/2003 | Lowrey et al. |
| 6,611,740 B2 | 8/2003 | Lowrey et al. |
| 6,641,038 B2 | 11/2003 | Gehlot et al. |
| 6,701,234 B1 | 3/2004 | Vogelsang |
| 6,732,020 B2 | 5/2004 | Yamagishi |
| 6,732,031 B1 | 5/2004 | Lightner et al. |
| 6,741,168 B2 | 5/2004 | Webb et al. |
| 6,762,020 B1 | 7/2004 | Mack et al. |
| 6,765,499 B2 | 7/2004 | Flick |
| 6,798,356 B2 | 9/2004 | Flick |
| 6,909,947 B2 | 6/2005 | Douros et al. |
| 6,925,425 B2 | 8/2005 | Remboski et al. |
| 6,946,966 B2 | 9/2005 | Koenig |
| 6,980,313 B2 | 12/2005 | Sharif et al. |
| 6,982,654 B2 | 1/2006 | Rau et al. |
| 6,988,033 B1 | 1/2006 | Lowrey et al. |
| 7,069,118 B2 | 6/2006 | Coletrane et al. |
| 7,082,359 B2 | 7/2006 | Breed |
| 7,092,803 B2 | 8/2006 | Kapolka et al. |
| 7,113,127 B1 | 9/2006 | Banet et al. |
| 7,119,669 B2 | 10/2006 | Lundsgaard et al. |
| 7,129,826 B2 | 10/2006 | Nitz |
| 7,133,661 B2 | 11/2006 | Hatae et al. |
| 7,143,290 B1 | 11/2006 | Ginter et al. |
| 7,155,259 B2 | 12/2006 | Bauchot et al. |
| 7,155,321 B2 | 12/2006 | Bromley et al. |
| 7,174,243 B1 | 2/2007 | Lightner et al. |
| 7,271,716 B2 | 9/2007 | Nou |
| 7,305,293 B2 | 12/2007 | Flick |
| 7,348,895 B2 | 3/2008 | Lagassey |
| 7,477,968 B1 | 1/2009 | Lowrey et al. |
| 7,565,230 B2 | 7/2009 | Gardner et al. |
| 7,671,727 B2 | 3/2010 | Flick |
| 7,715,961 B1 | 5/2010 | Kargupta |
| 7,747,365 B1 | 6/2010 | Lowrey et al. |
| 7,970,834 B2 | 6/2011 | Daniels et al. |
| 8,000,979 B2 | 8/2011 | Blom |
| 8,014,789 B2 | 9/2011 | Breed |
| 8,019,629 B1 | 9/2011 | Medina, III et al. |
| 8,041,635 B1 * | 10/2011 | Garcia .................. G06Q 20/10 705/39 |
| 8,069,060 B2 | 11/2011 | Tipirneni |
| 8,090,598 B2 | 1/2012 | Bauer et al. |
| 8,140,358 B1 | 3/2012 | Ling et al. |
| 8,214,100 B2 | 7/2012 | Lowrey et al. |
| 8,229,759 B2 | 7/2012 | Zhu et al. |
| 8,260,639 B1 * | 9/2012 | Medina, III .......... G06Q 40/08 705/4 |
| 8,271,187 B2 | 9/2012 | Taylor et al. |
| 8,285,588 B2 | 10/2012 | Postrel |
| 8,311,858 B2 | 11/2012 | Everett et al. |
| 8,321,086 B2 | 11/2012 | Park et al. |
| 8,330,593 B2 | 12/2012 | Golenski |
| 8,370,254 B1 | 2/2013 | Hopkins, III et al. |
| 8,401,877 B2 | 3/2013 | Salvagio |
| 8,403,225 B2 | 3/2013 | Sharra et al. |
| 8,417,604 B2 | 4/2013 | Orr et al. |
| 8,423,239 B2 | 4/2013 | Blumer et al. |
| 8,432,262 B2 | 4/2013 | Talty et al. |
| 8,433,590 B2 | 4/2013 | Prescott |
| 8,438,049 B2 | 5/2013 | Ranicar, III et al. |
| 8,442,508 B2 | 5/2013 | Harter et al. |
| 8,447,459 B2 | 5/2013 | Lowrey et al. |
| 8,452,486 B2 | 5/2013 | Banet et al. |
| 8,463,488 B1 | 6/2013 | Hart |
| 8,466,781 B2 | 6/2013 | Miller et al. |
| 8,478,514 B2 | 7/2013 | Kargupta |
| 8,484,113 B2 | 7/2013 | Collopy et al. |
| 8,494,938 B1 | 7/2013 | Kazenas |
| 8,510,200 B2 | 8/2013 | Pearlman et al. |
| 8,527,135 B2 | 9/2013 | Lowrey et al. |
| 8,547,435 B2 | 10/2013 | Mimar |
| 8,571,895 B1 * | 10/2013 | Medina, III .......... G06Q 40/08 705/4 |
| 8,577,703 B2 | 11/2013 | McClellan et al. |
| 8,595,034 B2 | 11/2013 | Bauer et al. |
| 8,598,977 B2 | 12/2013 | Maalouf et al. |
| 8,620,692 B2 | 12/2013 | Collopy et al. |
| 8,630,768 B2 | 1/2014 | McClellan et al. |
| 8,633,985 B2 | 1/2014 | Haynes et al. |
| 8,635,091 B2 | 1/2014 | Amigo et al. |
| 8,645,014 B1 | 2/2014 | Kozlowski et al. |
| 8,799,034 B1 | 8/2014 | Brandmaier et al. |
| 8,903,852 B1 | 12/2014 | Pedregal et al. |
| 8,935,036 B1 | 1/2015 | Christensen et al. |
| 9,325,807 B1 | 4/2016 | Meoli et al. |
| 2002/0063637 A1 | 5/2002 | Eida et al. |
| 2002/0111725 A1 | 8/2002 | Burge |
| 2002/0135679 A1 | 9/2002 | Scaman |
| 2003/0212567 A1 | 11/2003 | Shintani et al. |
| 2003/0233261 A1 | 12/2003 | Kawahara et al. |
| 2004/0083123 A1 | 4/2004 | Kim et al. |
| 2004/0088090 A1 | 5/2004 | Wee |
| 2004/0186744 A1 | 9/2004 | Lux |
| 2004/0189493 A1 | 9/2004 | Estus et al. |
| 2004/0205622 A1 | 10/2004 | Jones et al. |
| 2005/0021374 A1 | 1/2005 | Allahyari |
| 2005/0161505 A1 | 7/2005 | Yin et al. |
| 2005/0216487 A1 | 9/2005 | Fisher et al. |
| 2005/0278082 A1 | 12/2005 | Weekes |
| 2006/0224305 A1 | 10/2006 | Ansari et al. |
| 2006/0226960 A1 | 10/2006 | Pisz et al. |
| 2007/0009136 A1 | 1/2007 | Pawlenko et al. |
| 2007/0043594 A1 | 2/2007 | Lavergne |
| 2007/0136162 A1 | 6/2007 | Thibodeau et al. |
| 2007/0162308 A1 | 7/2007 | Peters |
| 2007/0288268 A1 | 12/2007 | Weeks |
| 2008/0027761 A1 | 1/2008 | Bracha |
| 2008/0242261 A1 | 10/2008 | Shimanuki |
| 2008/0294690 A1 | 11/2008 | McClellan et al. |
| 2009/0106052 A1 | 4/2009 | Moldovan |
| 2009/0156243 A1 | 6/2009 | Lichtenfeld et al. |
| 2009/0164504 A1 | 6/2009 | Flake et al. |
| 2009/0198772 A1 | 8/2009 | Kim et al. |
| 2009/0254241 A1 | 10/2009 | Basir |
| 2009/0265385 A1 | 10/2009 | Beland et al. |
| 2010/0030540 A1 | 2/2010 | Choi et al. |
| 2010/0131300 A1 | 5/2010 | Collopy et al. |
| 2010/0138242 A1 | 6/2010 | Ferrick et al. |
| 2010/0161491 A1 | 6/2010 | Bauchot et al. |
| 2010/0174564 A1 | 7/2010 | Stender et al. |
| 2011/0015946 A1 | 1/2011 | Buckowsky et al. |
| 2011/0070834 A1 | 3/2011 | Griffin et al. |
| 2011/0077028 A1 | 3/2011 | Wilkes et al. |
| 2011/0112870 A1 | 5/2011 | Berg et al. |
| 2011/0153369 A1 | 6/2011 | Feldman et al. |
| 2011/0161116 A1 | 6/2011 | Peak et al. |
| 2011/0161118 A1 | 6/2011 | Borden et al. |
| 2011/0185178 A1 | 7/2011 | Gotthardt |
| 2011/0281564 A1 | 11/2011 | Armitage et al. |
| 2011/0307188 A1 | 12/2011 | Peng et al. |
| 2012/0028680 A1 | 2/2012 | Breed |
| 2012/0047203 A1 | 2/2012 | Brown et al. |
| 2012/0072243 A1 | 3/2012 | Collins et al. |
| 2012/0076437 A1 | 3/2012 | King |
| 2012/0084179 A1 | 4/2012 | McRae et al. |
| 2012/0109690 A1 | 5/2012 | Weinrauch et al. |
| 2012/0109692 A1 | 5/2012 | Collins et al. |
| 2012/0119936 A1 | 5/2012 | Miller et al. |

(56) References Cited

U.S. PATENT DOCUMENTS

| | | | |
|---|---|---|---|
| 2012/0136802 A1* | 5/2012 | McQuade | G06Q 30/0282 705/347 |
| 2012/0150412 A1 | 6/2012 | Yoon et al. | |
| 2012/0191476 A1 | 7/2012 | Reid et al. | |
| 2012/0197486 A1 | 8/2012 | Elliott | |
| 2012/0197669 A1 | 8/2012 | Kote et al. | |
| 2012/0209631 A1 | 8/2012 | Roscoe et al. | |
| 2012/0209632 A1 | 8/2012 | Kaminski et al. | |
| 2012/0230548 A1 | 9/2012 | Calman et al. | |
| 2012/0232995 A1 | 9/2012 | Castro et al. | |
| 2012/0239417 A1 | 9/2012 | Pourfallah et al. | |
| 2012/0242503 A1 | 9/2012 | Thomas et al. | |
| 2012/0250938 A1 | 10/2012 | DeHart | |
| 2012/0259665 A1 | 10/2012 | Pandhi et al. | |
| 2012/0290150 A1 | 11/2012 | Doughty et al. | |
| 2012/0303392 A1 | 11/2012 | Depura et al. | |
| 2012/0316893 A1 | 12/2012 | Egawa | |
| 2012/0330687 A1 | 12/2012 | Hilario et al. | |
| 2013/0006674 A1 | 1/2013 | Bowne et al. | |
| 2013/0006675 A1 | 1/2013 | Bowne et al. | |
| 2013/0018676 A1 | 1/2013 | Fischer et al. | |
| 2013/0030642 A1 | 1/2013 | Bradley et al. | |
| 2013/0033386 A1 | 2/2013 | Zlojutro | |
| 2013/0035964 A1 | 2/2013 | Roscoe et al. | |
| 2013/0046510 A1 | 2/2013 | Bowne et al. | |
| 2013/0054274 A1 | 2/2013 | Katyal | |
| 2013/0073318 A1 | 3/2013 | Feldman et al. | |
| 2013/0073321 A1 | 3/2013 | Hofmann et al. | |
| 2013/0138267 A1 | 5/2013 | Hignite et al. | |
| 2013/0151288 A1 | 6/2013 | Bowne et al. | |
| 2013/0166098 A1 | 6/2013 | Lavie et al. | |
| 2013/0166326 A1 | 6/2013 | Lavie et al. | |
| 2013/0179027 A1 | 7/2013 | Mitchell | |
| 2013/0179198 A1 | 7/2013 | Bowne et al. | |
| 2013/0190967 A1 | 7/2013 | Hassib et al. | |
| 2013/0197945 A1 | 8/2013 | Anderson | |
| 2013/0204645 A1 | 8/2013 | Lehman et al. | |
| 2013/0211660 A1 | 8/2013 | Mitchell | |
| 2013/0226397 A1 | 8/2013 | Kuphal et al. | |
| 2013/0289819 A1 | 10/2013 | Hassib et al. | |
| 2013/0290036 A1 | 10/2013 | Strange | |
| 2013/0297353 A1 | 11/2013 | Strange et al. | |
| 2013/0297418 A1 | 11/2013 | Collopy et al. | |
| 2013/0300552 A1 | 11/2013 | Chang | |
| 2013/0304517 A1 | 11/2013 | Florence | |
| 2013/0311209 A1 | 11/2013 | Kaminski et al. | |
| 2013/0316310 A1 | 11/2013 | Musicant et al. | |
| 2013/0317860 A1 | 11/2013 | Schumann, Jr. | |
| 2013/0339062 A1 | 12/2013 | Brewer et al. | |
| 2014/0039934 A1 | 2/2014 | Rivera | |
| 2014/0039935 A1 | 2/2014 | Rivera | |
| 2014/0100889 A1 | 4/2014 | Tofte | |
| 2014/0197939 A1 | 7/2014 | Stefan et al. | |
| 2014/0200924 A1 | 7/2014 | Gilbert et al. | |
| 2014/0200929 A1 | 7/2014 | Fitzgerald et al. | |
| 2014/0244312 A1 | 8/2014 | Gray et al. | |
| 2015/0058045 A1 | 2/2015 | Santora | |

FOREIGN PATENT DOCUMENTS

| | | |
|---|---|---|
| CA | 2658219 A1 | 1/2008 |
| DE | 102010001006 A1 | 7/2011 |
| EP | 1826734 A1 | 8/2007 |
| EP | 1965361 A2 | 9/2008 |
| EP | 2481037 A1 | 8/2012 |
| GB | 2486384 A | 6/2012 |
| GB | 2488956 A | 9/2012 |
| KR | 20020067246 A | 8/2002 |
| WO | 2002079934 A2 | 10/2002 |
| WO | 2012045128 A1 | 4/2012 |
| WO | 2012067640 A1 | 5/2012 |
| WO | 2012097441 A1 | 7/2012 |
| WO | 2012106878 A1 | 8/2012 |
| WO | 2012173655 A1 | 12/2012 |
| WO | 2012174590 A1 | 12/2012 |

OTHER PUBLICATIONS

"Mercedes-Benz mbrace™." Oct. 22, 2010.
"Design and Development of a GSM Based Vehicle Theft Control System and Accident Detection by Wireless Sensor Network." International Journal of Emerging Trends in Engineering and Development, Issue 2, vol. 5, pp. 529-540. Jul. 2012.
"The Potential for Automatic Crash Notification Systems to Reduce Road Fatalities." Annals of Advances in Automotive Medicine, vol. 52, pp. 85-92. 2008. (retrieved from http://www.ncbi.nlm.nih.gov/pmc/articles/PMC3256762/ on Jan. 12, 2013).
"Automatic Crash Response, Car Safety, & Emergency Services—OnStar" retrieved from https://www.onstar.com/web/portal/emergencyexplore?tab=1&g=1 on Jan. 12, 2013.
"A study of US crash statistics from automated crash notification data." 20th International Technical Conference on the Enhanced Safety of Vehicles Conference (ESV). Lyon, France, pp. 18-21. 2007.
"Insurance Tech Trends 2013." Deloitte. 2013.
"Trends 2013—North American Insurance eBusiness and Channel Strategy." Forrester. May 16, 2013.
"Top 10 Technolgy Trends Impacting Life and PC Insurers in 2013." Gartner. Mar. 27, 2013.
"This App Turns Smartphones Into Safe Driving Tools." Mashable. Aug. 30, 2012. Retrieved from <http://mashable.com/2012/08/30/drivescribe-app-safe-driving> on Nov. 12, 2013.
"The Automated Collision Notification System." NHTSA. Retrieved from <http://www.nhtsa.gov/DOT/NHTSA/NRD/Articles/EDR/PDF/Research/Automated_Collision_Notification_System.pdf> on Nov. 12, 2013.
"ACN Field Operational Test—Final Report." NHTSA. Oct. 31, 2000.
"ACN Field Operational Test—Evaluation Report." NHTSA. Feb. 2001.
"Automatic Crash Notification." ComCARE Alliance. Retrieved from <http://www.nhtsa.gov/DOT/NHTSA/NRD/Articles/EDR/PDF/Research/ComCARE_ACN_System.pdf> on Nov. 12, 2013.
"Geico App—Android Apps on Google Play." Retreived from <https://play.google.com/store/apps/details?id=com.geico.mobile&hl=en> on Nov. 12, 2013.
Maciag, A. K. (1980). Motor accident insurance and systems of compensation. (Order No. MK49023, University of Alberta (Canada)). ProQuest Dissertations and Theses, 1. Retrieved from <http://search.proquest.com/docview/303097892?accountid=14753>. (303097892).
Spevacek, C. E., Ledwith, J. F., Newman, T. R., & Lennes, John B.,Jr. (2001). Additional insured and indemnification issues affecting the insurance industry, coverage counsel, and defense counsel—legal advice and practice pointers. FDCC Quarterly, 52(1), 3-101. Retrieved from <http://search.proquest.com/docview/201215466?accountid=14753>.
"Privacy Policy." Lemon Wallet. Retrieved from http://lemon.com/privacy on May 20, 2013.
"Design and implementation of a smart card based healthcare information system." Computer Methods and Programs in Biomedicine 81. pp. 66-78. Sep. 27, 2003.
"Information-Sharing in Out-of-Hospital Disaster Response: The Future Role of Information Technology." Abstracts of Prehospital and Disaster Medicine. Retrieved from http://journals.cambridge.org/action/displayAbstract?fromPage=online&aid=8231246 on May 20, 2013.
"For insurance companies, the day of digital reckoning." Bain & Company. 2013.
"New Idea: QR Codes for License Plates." Feb. 11, 2011. Retrieved from http://www.andrewcmaxwell.com/2011/02/new-idea-qr-codes-for-license-plates on May 21, 2013.
"QR Code." IDL Services. Retrieved from http://www.internationaler-fuehrerschein.com/en/the-idd/qr-code-quick-response-code-feature-in-the-idd.html on May 21, 2013.

(56) References Cited

OTHER PUBLICATIONS

"Vehicle Wrap Trends: What are QR Codes and why do I need one?" The Brandtastic Branding & Marketing Education Blog. Retrieved from http://www.sunrisesigns.com/our-blog/bid/34661/Vehicle-Wrap-Trends-What-are-QR-Codes-and-why-do-I-need-one on May 21, 2013.
"Near Field Communication: A Simple Exchange of Information." Samsung. Mar. 5, 2013. Retrieved from http://www.samsung.com/us/article/near-field-communication-a-simple-exchange-of-information on May 21, 2013.
"Microsoft Tag Implementation Guide." Aug. 2010.
"New Technology Security Risks : QR codes and Near Field Communication." Retrieved from http://www.qwiktag.com/index.php/knowledge-base/150-technology-security-risks-qr-codes on Nov. 13, 2013.
"Encrypted QR Codes." qrworld. Nov. 11, 2011. Retrieved from http://qrworld.wordpress.com/2011/11/27/encrypted-qr-codes on Nov. 12, 2013.
"Fraunhofer offers secure NFC keys that can be shared via QR codes." NFC World. Mar. 20, 2013. Retrieved from http://www.nfcworld.com/2013/03/20/323184/fraunhofer-offers-secure-nfc-keys-that-can-be-shared-via-qr-codes on Nov. 13, 2013.
"Automatic License Plate Recognition (ALPR) Scanning Systems." Retrieved from http://www.experiencedcriminallawyers.com/articles/automatic-license-plate-recognition-alpr-scanning-systems on Jun. 28, 2013.
"License plate readers allow police to quickly scan, check for offenders." Mar. 17, 2013. Retrieved from http://cjonline.com/news/2013-03-17/license-plate-readers-allow-police-quickly-scan-check-offenders on Jun. 28, 2013.
"Scan Someone's License Plate and Message Them Instantly with New Bump App." Sep. 17, 2010. Retrieved from http://www.popsci.com/cars/article/2010-09/social-networking-site-uses-license-plates-connect-drivers on Jun. 28, 2013.
"License Plate Scanner Obsoletes Meter Maid." Feb. 1, 2011. Retrieved from http://www.thetruthaboutcars.com/2011/02/license-plate-scanner-obsoletes-meter-maid on Jun. 28, 2013.
"Car insurance firms revving up mobile app features." Feb. 2, 2012. Retrieved from http://www.insurance.com/auto-insurance/auto-insurance-basics/car-insurance-mobile-apps.html on Jun. 28, 2013.
"Bump (application)." Retrieved from http://en.wikipedia.org/wiki/Bump_(application) on Aug. 29, 2013.
Domanico, A., Geico Releases Insurance Glovebox App for Android, Aug. 10, 2010. Retrieved from [http://androidandme.com/2010/08/applications/ geico-releases-insurance-glovebox-app-for-android/].
Feb. 11, 2016—U.S. Final Office Action—U.S. Appl. No. 14/029,469.
Feb. 18, 2016—U.S. Non-Final Office Action—U.S. Appl. No. 14/039,722.
Apr. 8, 2016—U.S. Non-Final Office Action—U.S. Appl. No. 14/313,753.
May 24, 2016—U.S. Notice of Allowance—U.S. Appl. No. 14/029,469.
Sep. 22, 2016—U.S. Office Action—U.S. Appl. No. 14/313,753.
Apr. 11, 2017—U.S. Non-Final Office Action—U.S. Appl. No. 14/313,753.
Mar. 24, 2017—U.S. Non-Final Office Action—U.S. Appl. No. 14/022,552.
*Electronic Exchange of Insurance Information*, U.S. Appl. No. 14/039,722, filed Sep. 27, 2013.
*Automatic Exchange of Information in Response to a Collision Event*, U.S. Appl. No. 14/313,753, filed Jun. 24, 2014.
*Automated Accident Detection, Fault Attribution, and Claims Processing*, U.S. Appl. No. 13/791,386, filed Mar. 8, 2013.
*Determining Whether a Vehicle is Parked for Automated Accident Detection, Fault Attribution, and Claims Processing*, U.S. Appl. No. 14/688,611, filed Apr. 16, 2015.
*Obtaining Insurance Information in Response to Optical Input*, U.S. Appl. No. 14/029,469, filed Sep. 17, 2013.
*Maintaining Current Insurance Information at a Mobile Device*, U.S. Appl. No. 14/022,552, filed Sep. 10, 2013.
Jun. 29, 2017—U.S. Non-Final Office Action—U.S. Appl. No. 14/039,722.
"Mercedes-Benz mbrace: Safety & Security Services", Rev. Apr. 9, 2012, Mercedes-Benz, <https://www.mbusa.com/vcm/MB/DigitalAssets/pdfmb/mbrace_Cut_Sheet_All_4_12_12_.pdf>, 37 pages.
Freeman, Shanna, "How OnStar Works", Feb. 8, 2006, HowStuffWorks.com, <http://auto.howstuffworks.com/onstar.htm>, 12 pages.
"GenieCam", on AngelList by Selka Inc. w/GenieCam website excerpt, Dec. 11, 2012, AngelList <https://angel.co/geniecam>, 6 pages.
"ATX Launches Enhanced Automatic Collision Notification for BMW", TMC News, Jan. 11, 2009, <http://www.tmcnet.com/2009/01/11/3905139.htm>, 2 pages.
Aug. 10, 2017—U.S. Office Action—U.S. Appl. No. 14/688,611.
Nov. 17, 2017—U.S. Notice of Allowance—U.S. Appl. No. 14/313,753.
Jeevagan et al, RFID Based Vehicle Identification During Collisions, R.V. College of Engineering, Dept. of Instrumentation Technology, Bangalore, Karnataka, India, IEEE Global Humanitarian Technology Conference (GHTC), downloaded from Google/Scholar, Nov. 13, 2017.
Harding, S.J. (2002), The "Alva Cape" and the Automatic Identification System: The Use of VHF in Collision Avoidance at Sea, The Journal of Navigation, 55(3), pp. 431-442.
Dec. 7, 2017—U.S. Final Office Action—U.S. Appl. No. 14/039,722.
Dec. 28, 2017—U.S. Final Office Action—U.S. Appl. No. 14/688,611.
Jan. 4, 2018—U.S. Final Office Action—U.S. Appl. No. 14/022,552.
Mar. 9, 2018—U.S. Notice of Allowance—U.S. Appl. No. 14/313,753.
Jul. 5, 2018—U.S. Non-Final Office Action—U.S. Appl. No. 15/235,213.
Aug. 2, 2018—U.S. Non-Final Office Action—U.S. Appl. No. 14/039,722.

* cited by examiner

AUTOMATED ACCIDENT DETECTION, FAULT ATTRIBUTION, AND CLAIMS PROCESSING

CROSS-REFERENCE TO RELATED APPLICATION

This application claims priority to U.S. patent application Ser. No. 13/791,338 entitled "AUTOMATED ACCIDENT DETECTION, FAULT ATTRIBUTION, AND CLAIMS PROCESSING" and filed on Mar. 8, 2013 which is incorporated by reference herein in its entirety.

TECHNICAL FIELD

The present invention relates in general to processing insurance claims and relates in particular to automated collision detection, fault attribution, and insurance claims processing.

BACKGROUND

Processing an insurance claim following a vehicle accident can be a complex and time-consuming process. Individuals involved in the accident must exchange insurance information and file insurance claims. Insurance companies for the individuals involved in the accident must determine the amount of damage caused to the vehicles, pay out on insurance claims, and recover damages from the liable party.

Current claims processing approaches may involve interaction with multiple insurance agents, claims adjusters, subrogation representatives, and the like. Accordingly, current approaches to claims processing may include the processing of paperwork, telephone calls, and face-to-face meetings. As a result, a significant amount of time can elapse between the time the claim is filed and final settlement of the claim.

Therefore, a need exists for improved approaches to processing insurance claims in response to a vehicle accident.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

A communication module may receive communications from a vehicle or sensors attached to a vehicle. A collision detection module may determine that a collision has occurred at a vehicle based on the one or more of the communications received from a vehicle or sensors attached to a vehicle. A participant identification module may identify one or more participants involved in the collision based on one or more communications received from the vehicle or sensors attached to the vehicle. A fault determination module may identify one of the participants as the at-fault participant based on a comparison of a fault determination ruleset to vehicle telematics data included in one or more of the communications received from the vehicle or sensors attached to the vehicle. A repair cost estimation module may calculate an estimated repair cost based on vehicle diagnostic data included in one or more of the communications received from the vehicle or sensors attached to the vehicle. A claims processing module may determine whether to file an insurance claim associated with one of the participants based on the estimated repair cost.

Aspects of the disclosure may be provided in non-transitory computer-readable media having computer-executable instructions stored thereon that, when executed, cause a processor of a computing device cause the processor to perform one or more of the processes described in this disclosure.

DETAILED DESCRIPTION

Figure 1:
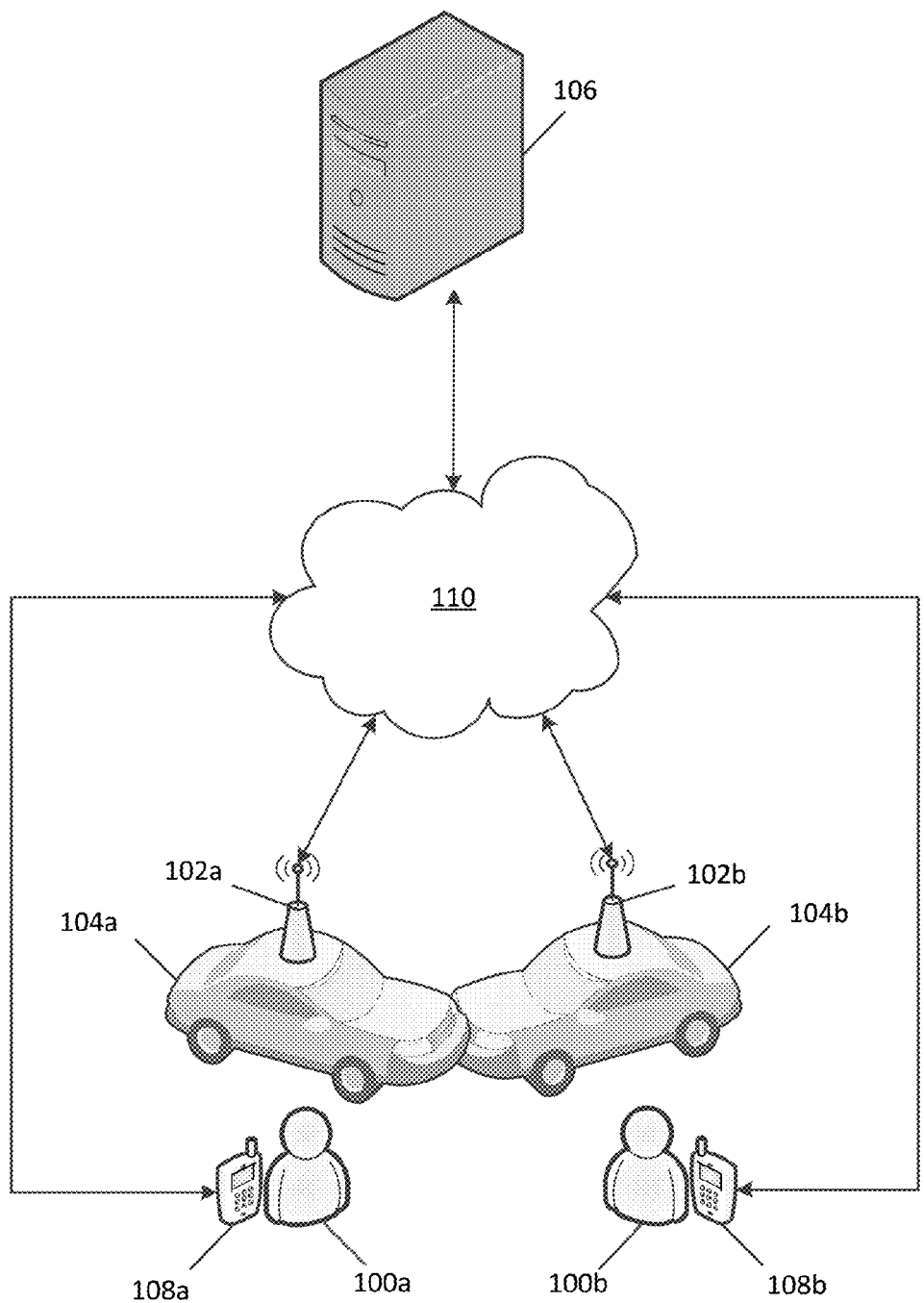
FIG. 1 is an illustrative environment in which various aspects of the disclosure may be implemented.

Aspects of the present disclosure are directed towards automated collision detection, fault attribution, and insurance claims processing. Referring to FIG. 1, two individuals 100a, 100b may experience a vehicle collision, e.g., an accident. Wireless communication devices 102a, 102b at each vehicle 104a, 104b may wirelessly communicate with an automated collision detection, fault attribution, and claims processing system 106. The automated collision detection, fault attribution, and claims processing system 106 may be additionally or alternatively referred to as an insurance processing system. Communications may be exchanged between the system 106 and a mobile device 108a, 108b operated by the individual 100a, 100b, respectively, via, for example, a network 110. The system 106 may automatically detect that a collision has occurred, automatically determine which individual 100a or 100b is at fault for the accident, and manage subsequent insurance claims resulting from the accident. The system 106 may also communicate with the individuals 100a, 100b via respective mobile devices 108a, 108b operated by the individuals. It will be appreciated that, in some instances, more than two individuals may be involved in an accident. It will also be appreciated that, in some instances, a single vehicle may be involved in an accident. For example, an individual may hit a pole or a wall or the individual may forget to set a parking brake causing the vehicle to run away on its own. Accordingly, aspects of this disclosure are also applicable in situations where a single vehicle is involved in an accident.

As used throughout the description, the various terms may be used to refer to the entities involved or associated with the automated collision detection, fault attribution, and claims processing procedures. A participant in this context is an individual 100a, 100b whose vehicle 104a, 104b was involved in a collision. A participant may or may not be a customer of an insurance provider that provides insurance coverage. In some instances, participants may be customers of the same insurance provider while in other instances the participants may be customers of different insurance providers. An insurance provider may be referred to as an insurer, and a customer of the insurer may be referred to as an insured. The insurer may provide and operate the insurance management system 106 to automatically detect collisions, to automatically determine and attribute fault, and to automatically process insurance claims resulting from the vehicle collision.

Each participant in the vehicle collision may be insured by the insurance provider that operates the insurance management system 106. In some situations, the participants may be respectively insured by different insurance providers in which case one of the participants may be described as being insured by a third-party insurance provider, e.g., a third-party insurer. The third-party insurer may operate a third-party insurance management system that also automatically detects collisions, determines and attributes fault, and processes insurance claims.

As a result of a vehicle collision, respective insurance claims may be filed by one or more of the participants. Accordingly, a claimant may be a participant for which an insurance claim has been filed. The claimant may be insured by the insurance provider or the third-party insurance provider. In other words, the claimant may or may not be a customer of the insurer that operates the insurance management system. In addition, the claimant may or may not be the at-fault participant, e.g., the participant to whom fault for the collision is attributed and liability assigned.

Moreover, a collision is but one type of physical disturbance event that may occur involving a vehicle. Stated more broadly, aspects of the disclosure are directed towards determining when a physical disturbance event or incident occurs at a vehicle. A physical disturbance may be, for example, two moving vehicles impacting one another, one moving vehicle impacting a stationary object (e.g., a non-moving vehicle, a parked vehicle, a wall, etc.), a towing of the vehicle, a break-in or burglary at the vehicle, and other events that physical disturb the vehicle. While aspects of the disclosures set forth below are described in the context of vehicle collisions, it will be appreciated that the disclosures are also applicable to other physical disturbance events involving the vehicle.

The insurance management system 106 provides a number of advantages by automating aspects of responding to collisions. As an example, the insurance management system 106 advantageously reduces the cost, time, and effort involved in processing and resolving an insurance claim by automating aspects of the claim processing and resolution process. The insurance management system 106 may automatically collect information relating to the collision, automatically determine and attribute fault to one of the participants, automatically estimate the cost to repair a damaged vehicle, and automatically provide settlement offers to participants involved in vehicle collisions. Moreover, by automating aspects of responding to vehicle collisions, the insurance management system 106 may advantageously provide automated settlement offers within a relatively short timeframe after the collision occurred. The insurance management system 106 described below also advantageously reduces the cost, time, and effort associated with subrogation by automating aspects of the subrogation process. These and other aspects will be discussed further below.

Figure 2:
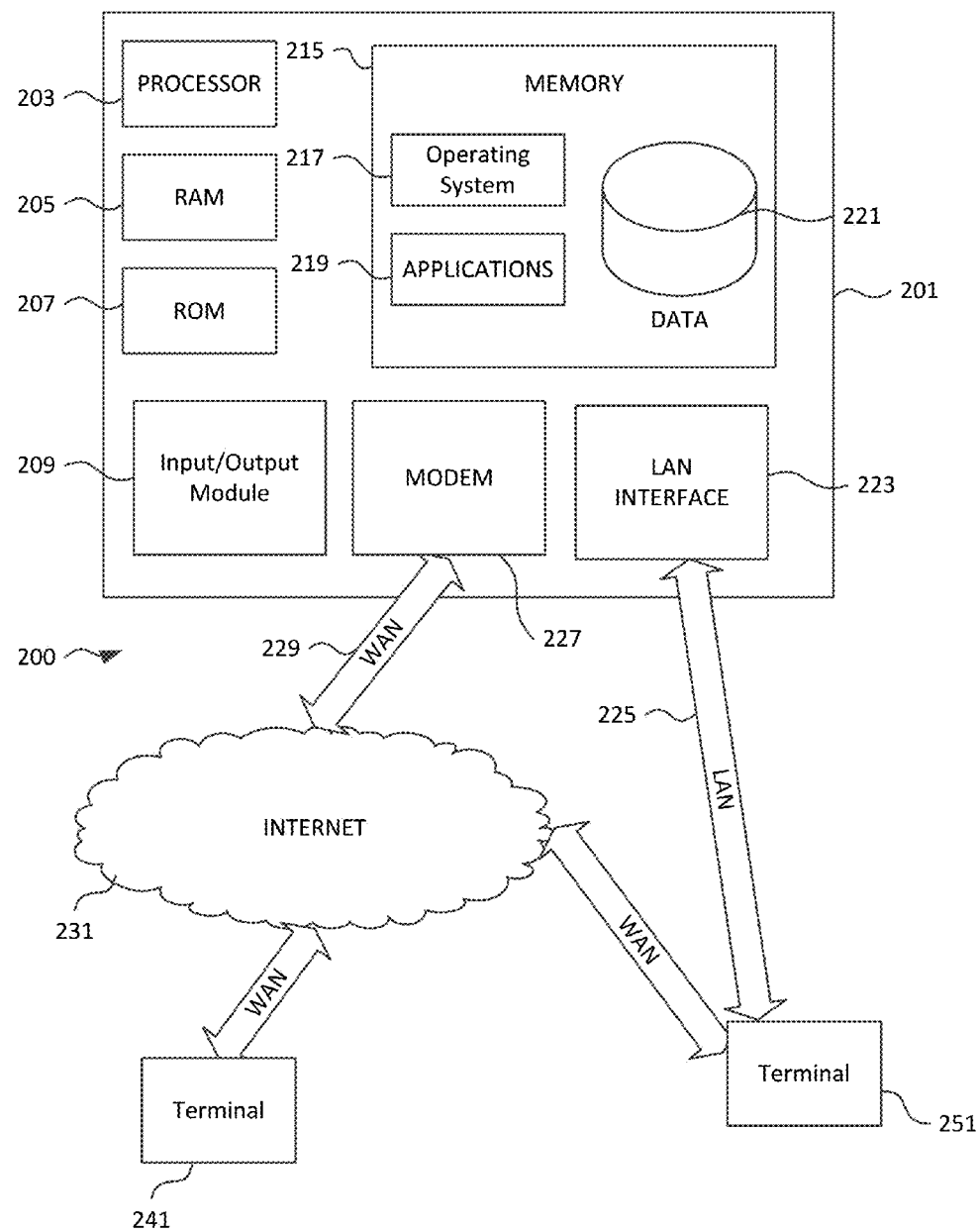
FIG. 2 is an example of an implementation of an operating environment in which various aspects of the disclosure may be implemented.

Referring to FIG. 2, an example of an implementation of an operating environment in which various aspects of the disclosure may be implemented is shown. In accordance with various aspects of the disclosure, methods, computer-readable media, and apparatuses are disclosed through which collisions may be automatically detected, fault automatically determined, and insurance claims automatically processed. In certain aspects, when an insurance management system receives data regarding a collision (e.g., from a vehicle), the insurance management system processes the data and manages the various automated procedures involved in responding to the collision.

The automated procedures may utilize various hardware components (e.g., processors, communication servers, memory devices, sensors, etc.) and related computer algorithms to detect that a collision has occurred, identify the participants involved in the collision, determine which participant was at fault, calculate an estimated repair cost, process any resulting insurance claims, and detect attempts at fraud.

FIG. 2 illustrates a block diagram of an insurance management system 200 (e.g., a computer server) that may be used according to an illustrative embodiment of the disclosure. The server 201 may have a processor 203 for controlling operation of various aspects of the insurance management system 200 and its associated components, including RAM 205, ROM 207, input/output module 209, and memory 215. The insurance management system 200 may include multiple servers 201 for controlling operation of respective aspects of the insurance management system.

I/O module 209 may include a microphone, keypad, touch screen, stylus, and/or other input sources through which a user of the server 201 may provide input, and may also include one or more of a speaker for providing audio output and a video display device for providing textual, audiovisual, and/or graphical output. Software may be stored within memory 215 to provide instructions to processor 203 for enabling server 201 to perform various functions. For example, memory 215 may store software used by the server 201, such as an operating system 217, application programs 219, and an associated database 221. Processor 203 and its associated components may allow the server 201 to run a series of computer-readable instructions to detect that a collision has occurred, identify the participants involved in the collision, determine which participant was at fault, and process any resulting insurance claims. The server 201 may operate in a networked environment supporting connections to one or more remote computers, such as terminals 241 and 251. The terminals 241 and 251 may be personal computers or servers that include many or all of the elements described above relative to the server 201. Also, terminal 241 or 251 may be data stores for storing data relating to the collision as well as the vehicles and participants involved in the collision. In yet other embodiments, terminals 241 and 251 may represent mobile devices respectively operated by the participants involved in the collision.

The network connections depicted in FIG. 2 include a local area network (LAN) 225 and a wide area network (WAN) 229, but may also include other networks such as a metropolitan area network (MAN) or a cellular network. When used in a LAN networking environment, the server 201 is connected to the LAN 225 through a network interface or adapter 223. When used in a WAN or MAN networking environment, the server 201 may include a modem 227, the network interface or adapter 223, or other means for establishing communications over the WAN 229 (or MAN), such as the Internet 231. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 219 used by the server 201 according to an illustrative embodiment of the disclosure may include computer executable instructions for invoking functionality related to detect that a collision has occurred, identify the participants involved in the collision, determine which participant was at fault, and process any resulting insurance claims. As noted above, multiple servers 201 having respective application programs 219 may be employed to implement and invoke this functionality. The insurance management system 201 and/or terminals 241 or 251 may also be mobile terminals including various other components, such as a battery, speaker, camera, and antennas (not shown).

The disclosure is operational with numerous other general purpose or special purpose computing system environments or configurations. Examples of well-known computing systems, environments, or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-readable instructions, such as program modules, that are executable by a processor of a computer. Generally, program modules include routines, programs, objects, components, data structures, etc. that perform particular tasks or implement particular abstract data types. The disclosure may also be practiced in distributed computing environments where tasks are performed by remote processing devices or systems that are linked through a communications network. In a distributed computing environment, program modules may be located in both local and remote computer storage media including non-transitory memory storage devices, such as a hard disk, random access memory (RAM), and read only memory (ROM).

Figure 3:
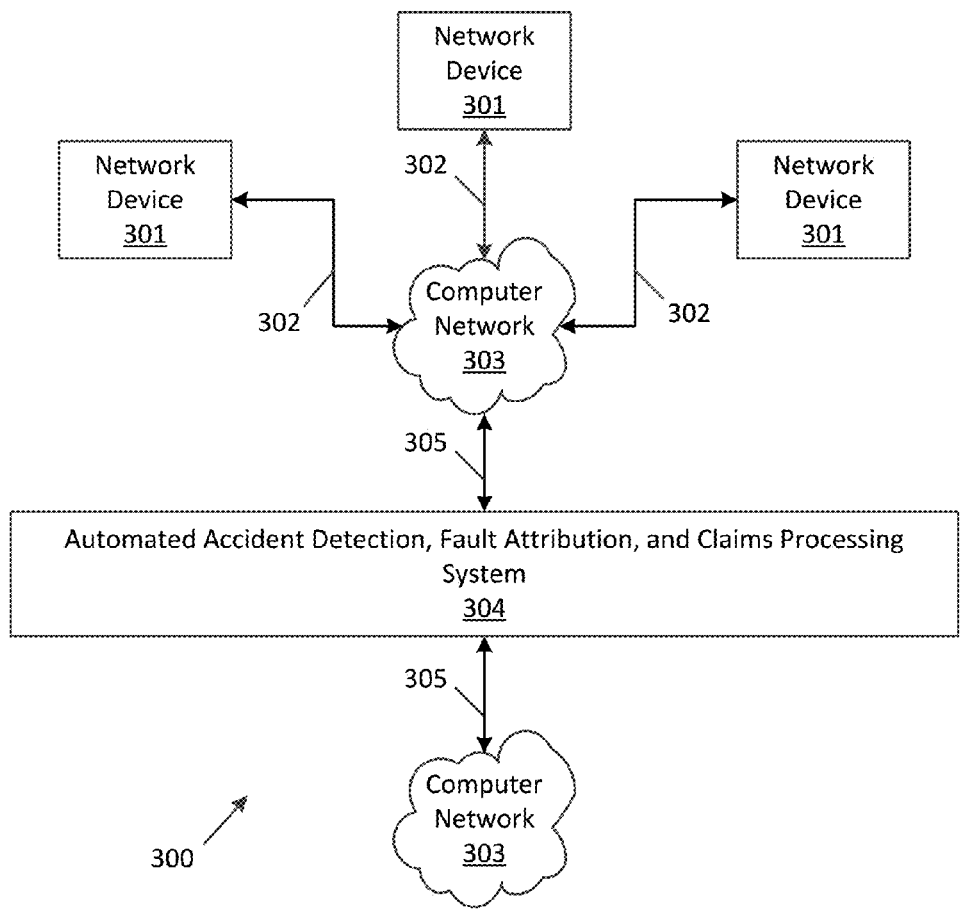
FIG. 3 is an example of an implementation of network devices and servers that may be used to implement the processes and functions of certain aspects of the present disclosure.

With reference to FIG. 3, a system 300 for implementing methods according to the present disclosure is shown. As illustrated, the system 300 may include one or more network devices 301. The devices 301 may be local or remote, and are connected by one or more communications links 302 to a computer network 303 that is linked via communications links 305 to an insurance management system 304. In certain embodiments, the network devices 301 may run different algorithms used by the insurance management system 304 for detecting that a collision has occurred, identifying the participants involved in the collision, determining which participant was at fault, and processing any resulting insurance claims. In yet other embodiments, the network devices 301 may represent mobile computing devices utilized by the participants involved in the collision to exchange communications relating to the collision. In system 300, the insurance management system 304 may be one or more of any suitable server, processor, computer, or data processing device, or combination of the same.

Computer network 303 may be any suitable computer network including the Internet, an intranet, a metropolitan area network (MAN), a wide-area network (WAN), a local-area network (LAN), a wireless network, a digital subscriber line (DSL) network, a frame relay network, an asynchronous transfer mode (ATM) network, a virtual private network (VPN), or any combination of any of such networks. Communications links 302 and 305 may be any communications links suitable for communicating between the network devices 301 and the insurance management system 304, such as network links, dial-up links, wireless links, hardwired links, etc. The example method steps discussed below may be implemented by one or more of the components in FIGS. 2-3 or other components, including other computing devices.

Figure 4:
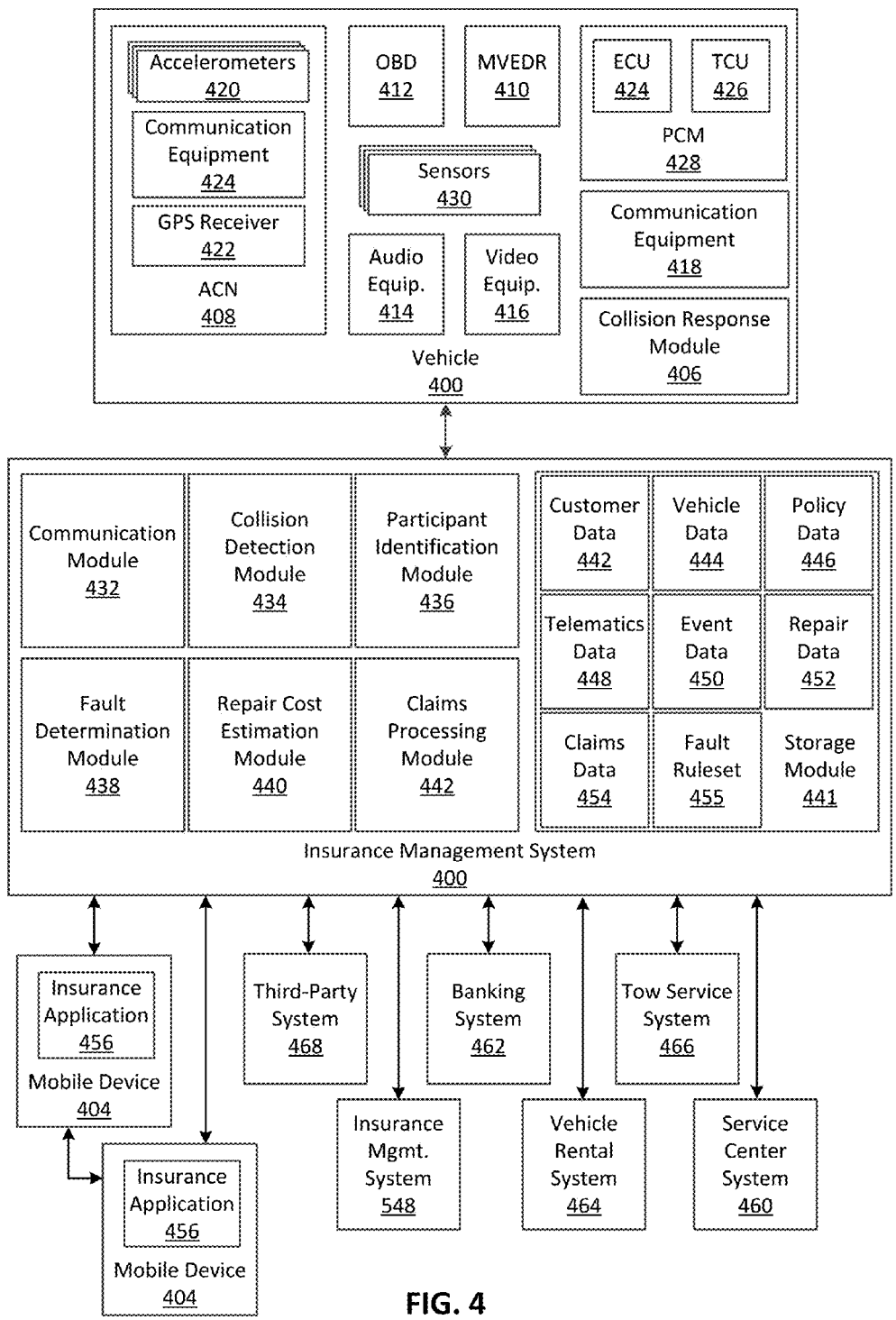
FIG. 4 is an example of an implementation of an insurance management system.

Referring now to FIG. 4, an example of an implementation of an insurance management system 400 for automatically detecting a vehicle collision, attributing fault, and processing insurance claims is shown. The insurance management system 400 is in signal communication with a vehicle 402 such that the insurance management system is capable of detecting a collision involving the vehicle and exchanging communications with the vehicle. The insurance management system 400 may also be in signal communication with one or more mobile computing devices 404 operated by the collision participants such that the insurance management system is capable of exchanging communications with the mobile computing devices.

The insurance management system 400 may receive data from the vehicle 402 including, for example, vehicle identification data, vehicle telematics data, collision data, and vehicle diagnostic data. In some example implementations, the insurance management system 400 may receive participant identification data (e.g., name, customer number, etc.) from the vehicle 402 as well. The vehicle 402 may include various components to collect and provide this data to the insurance management system 400. It will be appreciated that these components may be interconnected and in signal communication with each other via various vehicle busses (not shown).

The vehicle 402 may include, for example, a collision response module (CRM) 406 for coordinating the operation of the other vehicle systems, devices, and components in response to a collision involving the vehicle. As noted above a collision may be one type of physical disturbance event that can occur involving the vehicle. Accordingly, the collision response module 406 may additionally or alternatively referred to more broadly as a disturbance response module. In this regard, the collision response module 406 may be understood as a type of controller that interacts with various vehicle systems, devices, and components in order to obtain data that is utilized when responding to the collision. As an example, the collision response module 406 of the vehicle 402 may be in signal communication with: an automated collision notification device (ACN) 408 that automatically detects vehicle collisions and provides notifications of a vehicle collision; a motor vehicle event data recorder (MVEDR) 410 that records event data relating to the operation of the vehicle prior to or during a collision; and an on-board diagnostic unit (OBD) 412 that monitors vehicle systems, devices, and components and provides diagnostic data relating to the health, status, or condition of these components. The CRM 406, ACN 408, MVEDR 410, and ODB 412 may include one or more respective memories (not shown) for storing and retaining data relating to the condition, status, or operation of the vehicle 402 for both normal driving events and collision events. The CRM 406 of the vehicle 402 may additionally be in signal communication with one or more recording devices, e.g., audio recording equipment 414 and video recording equipment 416 (A/V equipment) that respectively records audio data and video data at the vehicle. Furthermore the CRM 406 may be in signal communication with communication equipment 418 for transmitting the data from these components via a network to various systems, such as, for example, an insurance management system 400. The communication equipment 418 of the vehicle 402 may be configured to wirelessly communicate via, for example, a cellular network or an internet protocol-based network (IP). It will be appreciated that the communication equipment 418 may be configured to wirelessly communicate using additional or alternative approaches for wireless communication.

The ACN 408 may include components for automatically detecting vehicle collisions and providing notifications of the vehicle collision. Those skilled in the art will recognize that these components may include, for example, one or more accelerometers 420 (e.g., triaxial accelerometers) for detecting changes in the velocity of the vehicle 402, a location determination device 422 such as a Global Positioning System (GPS) receiver for determining the geographic location of the vehicle, and communication equipment 424 for transmitting one or more collision notification messages. Based on the changes in velocity detected by the accelerometers 420, the ACN 408 may determine that a collision has occurred. The ACN 408 may then prepare a collision notification message that includes, for example, vehicle identification data, GPS location data, and collision data. The communication equipment 424 of the ACN 408 may similarly be configured to communicate wirelessly, for example, via a cellular network or an IP-based network. The ACN 408 may transmit the collision notification information to, e.g., an insurance management system 400. In some example implementations the ACN 408 may transmit the collision notification message directly to the insurance management system using the communication equipment of the ACN. In other example implementations, the ACN may transmit the collision notification message to the CRM 406, which may in turn utilize the communication equipment 418 of the vehicle 402 to transmit a corresponding collision notification message to the insurance management system 400. It will also be appreciated that in other example implementations, the vehicle 402 may respectively include the individual components of the ACN 408 (e.g., the accelerometers 420, the GPS receiver 422, etc.) rather than the ACN itself and utilize these components in conjunction with the CRM 406 and the communication equipment 418 of the vehicle to detect and provide notifications of a collision.

The MVEDR 410 may also be referred to a vehicle "black box" (e.g., a crash-proof memory device) that records vehicle telematics data. Vehicle telematics data refers to technical information relating to the status or operation of the vehicle 402 prior to or during a vehicle event such as a collision or other physical disturbance event involving the vehicle. As noted above, individuals involved in or associated with the physical disturbance event may be referred to as participants, and participants may or may not be customers of an insurer that operates the insurance management system 400.

Vehicle telematics data may include, for example, directional acceleration and deceleration (e.g., forward/backward, left/right, up/down), change in directional acceleration, vehicle speed or velocity, engine throttle and RPM (revolutions per minute), steering input, engagement of various vehicle subsystems (e.g., stability control systems, antilock brake systems), and the like. Those skilled in the art will appreciate that the MVEDR 410 may be configured to collect and record other types of data relating to the operation and status of the vehicle 402 prior to or during a vehicle event.

The OBD 412 is a system configured to continuously monitor various components of the vehicle 402 such as the powertrain, chassis, and body of the vehicle as well as various automotive devices. The OBD 412 may collect and report automotive diagnostic data in accordance with the OBD-II protocol standard. The OBD 412 may be in signal communication with an engine control unit (ECU) 424 and the transmission control unit (TCU) 426 of a powertrain control module (PCM) 428 to monitor and record diagnostic data from these components. The OBD 412 (as well as the ECU 424 and TCU 426) may be in signal communication with various automotive sensors 430 throughout the vehicle 402 that provide sensor data relating to various systems, components, and devices of the vehicle including, for example, the engine, transmission, chassis, body, and the like. The sensors 430 may thus indicate the status and condition of these vehicle components. Sensors 430 may also include sensors that can detect the status and condition of the vehicle wheels and tires as well as sensors that can detect damage to the panels of the vehicle body, e.g., deformations, dents, punctures, and so forth. Those skilled in the art will appreciate that the automotive sensors 430 may include, for example, temperature sensors, pressure sensors, angular position sensors, linear position sensors, rotational motion sensors, inertial sensors, and the like.

As noted above, the vehicle 402 may transmit data from a vehicle to an insurance management system 400. The insurance management system 400 may include various systems, subsystems, modules, and the like to facilitate automated detection of collisions, automated identification of participants, automated determination and attribution of fault, and automated insurance claims processing. The insurance management system 400 may include for example: a communication module 432 that exchanges communications with the vehicle and other remote systems and devices; a collision detection module 434 that automatically detects vehicle collisions; a participant identification module 436 that automatically identifies the participants involved in a vehicle collision; a fault determination module 438 that automatically determines which participant is at fault for the collision; a repair cost estimation module 440 that determines an estimated repair cost; and an insurance claims processing module 442 that automates aspects of the insurance claims process. The communication module may manage the communications exchanged between the modules of the insurance management system 400 and the vehicle 402, mobile computing devices 404, and remote systems. In this regard, the communication module 432 may function as the communication gateway for the insurance management system 400. In some example implementations, the communication module 432 may include one or more web servers for managing the exchange of communications.

The insurance management system 400 may also include a storage module 441 having one or more data stores to facilitate automated collision detection, fault determination, and claims processing. The data stores of the storage module 441 may include, for example: a customer data store 442 that stores biographic or demographic information relating to insurance customers; a vehicle data store 444 that stores vehicle profile information; a policy data store 446 that stores the insurance policy information for the customers insured by the insurers; a vehicle telematics data store 448 that stores vehicle telematics information provided by the vehicles; an event data store 450 that stores information relating to collisions; a repair data store 452 that stores vehicle repair information; and a claims data store 454 that stores information relating to insurance claims. The data store 440 may also store a fault determination ruleset 455 used to determine which participant in a vehicle collision was at fault for the collision.

The customer biographic and demographic data may include, for example, customer name, address, contact information (e.g., mailing address, home phone number, mobile phone number, email address, etc.), date of birth, age, marital status, and so forth. Vehicle profile data may include information that identifies and describes a vehicle, for example, a vehicle make, model, year, color, vehicle identification number (VIN), vehicle classification, and so forth. The insurance policy data may include information describing the insurance coverage for an insured such as insurance premium information, deductible information, covered vehicles, coverage types, and coverage levels. Vehicle telematics data may include data relating to the movement and operation of a vehicle as discussed above with reference to the MVEDR 410. Event data may include, for example, data identifying the date, time, and location (e.g., GPD coordinates) of the collision. Repair data may include repair estimates correlated with or otherwise associated with vehicle telematics data and vehicle diagnostic data. Repair data may also include estimates of total vehicle value.

A database management system (not shown) may implement an insurance management data model that models the relationships between the customer data, vehicle data, insurance policy data, vehicle telematics data, event data, repair data, and claims data stored in the data stores 442-454 of the storage module 441. The insurance management data model may be implemented, for example, as one or more databases that define respective tables, attributes, and relationships corresponding to the insurance management data model. The data store may thus store and retain the data described above as respective related or unrelated records in accordance with the insurance management data model.

In addition to the vehicle 402, the insurance management system 400 may be in signal communication with one or more mobile computing devices 404 operated by insurance customers or participants involved in a vehicle collision. A mobile computing device 404 may store and execute an insurance application 456, and an individual may interact with the insurance application to carry out various insurance-related tasks. In this way, the insurance management system 400 may communicate with individuals such as customers and participants. The mobile computing device 404 may be a computing device configured to wirelessly communicate with the insurance management system 400 via a network. As noted above, in some example implementations, the mobile computing device may be, for example, a mobile cellular telephone.

The insurance management system 400 may also be in signal communication with one or more computing devices of one or more remote systems via a network. In this example, the insurance management system 400 is shown to be in signal communication with another insurance management system 458, a system 460 of a repair service, a system 462 of a banking institution, a system 464 of a vehicle rental service, a system 466 of a vehicle tow service, and other third-party systems 468. The interaction of the insurance management system 400 with these remote systems 458-468 will be discussed in further detail below.

Figure 5:
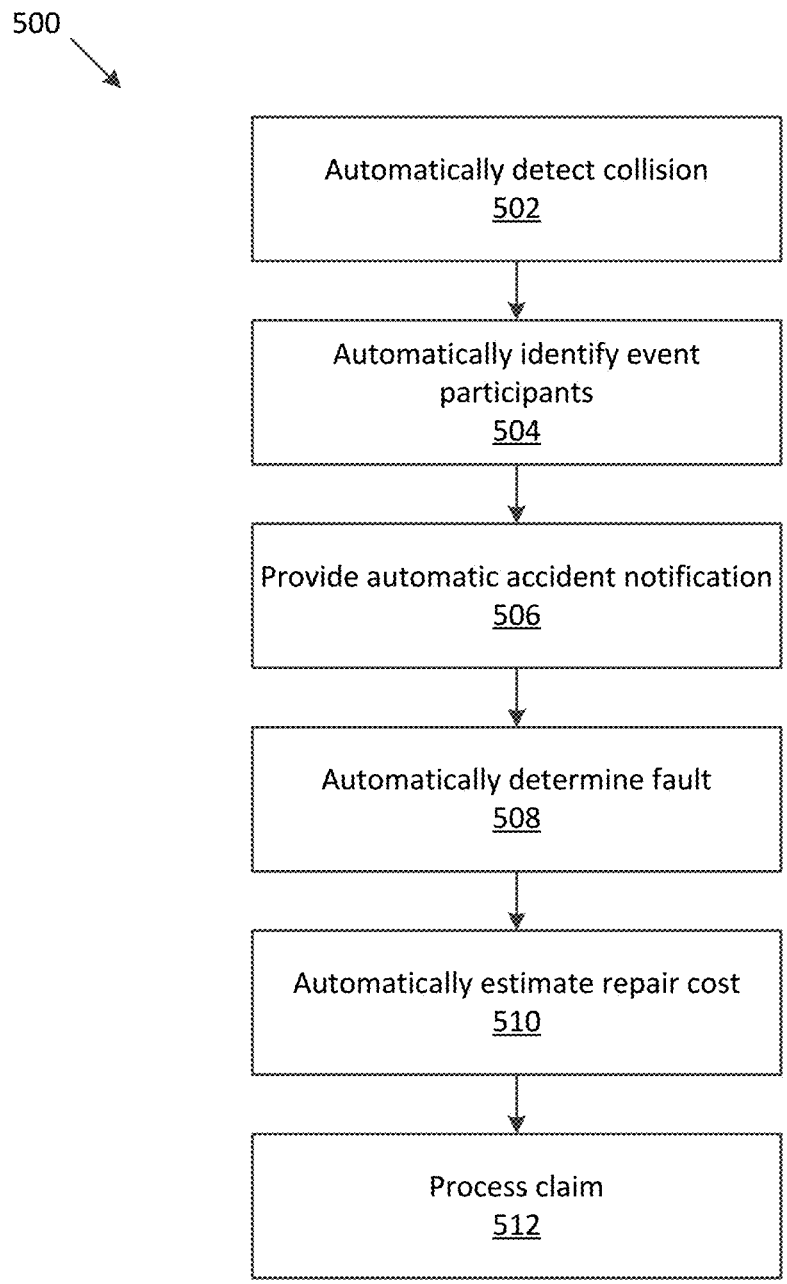
FIG. 5 is a flowchart of example method steps for detecting and responding to a collision.

Referring to FIG. 5 a flowchart 500 of example method steps for automatically detecting vehicle collisions, determining fault, and managing insurance claims is shown. A collision detection module 434 (FIG. 4) of an insurance management system 400 may detect that a collision between vehicles has occurred (step 502). As discussed further below, the collision detection module 434 may detect the collision based on a collision notification message received from an ACN 408 or CRM 406 of a vehicle or, additionally or alternatively, based on an analysis of vehicle telematics data received from a vehicle 402.

A participant identification module 436 of the insurance management system 400 may then attempt to identify the participants of the collision (step 504). As discussed further below, the participant identification module 436 may attempt to identify the participants based, at least in part, on event data 450 obtained by the collision detection module 434. The insurance management system 400 may then automatically notify the participants that a collision has been detected (step 506). A communication module 432 of the insurance management system 400 may transmit an event notification message to the mobile computing devices 404 respectively operated by the participants. A participant may then be able to provide additional information relating to the collision in order to assist in the fault determination and claims processing procedures.

Having identified and notified the participants, a fault determination module 438 may attempt to automatically ascertain which participant was at fault for the collision (step 508). The fault determination module 438 may employ a fault determination ruleset 455 to determine and identify the at-fault participant. The fault determination module 438 may analyze vehicle telematics data in accordance with the fault determination ruleset 455 to determine and attribute fault. Fault determination and attribution will be discussed in further detail below.

A repair cost estimation module 440 may then determine an estimated repair cost for the damage caused to a vehicle 402 associated with a participant involved in the collision (step 510). The repair cost estimation module 440 may determine an estimated repair cost based on vehicle telematics data obtained by the MVEDR 410 of the vehicle 402 and diagnostic data 452 obtained by the OBD 412 of the vehicle. The communication equipment 418 at the vehicle 402 may transmit the vehicle telematics data and the diagnostic data 452 to the communication module 432 of the insurance management system 400. The communication module 432 may then forward the vehicle telematics data and diagnostic data to the repair cost estimation module 440 for analysis.

Having estimated the cost to repair the damaged vehicle, a claims processing module 442 of the insurance management system 400 may process an insurance claim associated with one of the participants involved in the collision (step 512). As noted above, the insurance claim may be filed against the at-fault participant for the participant that was not at fault, or the insurance claim may be filed for the at-fault participant. The insurance management system 400 may communicate with the participant via an insurance application 456 operating at mobile computing device 404. The insurance management system 400 may exchange communications with the participant via the insurance application 456 to obtain additional information used when processing the insurance claim. In this way, the insurance management system 400 advantageously automates aspects of identifying and responding to collisions. Accordingly, it will be appreciated that some of the steps described above and in further detail below relating to identifying and responding to collisions may performed automatically or, alternatively, performed manually by an individual.

Automated Accident Detection

Figure 6A:
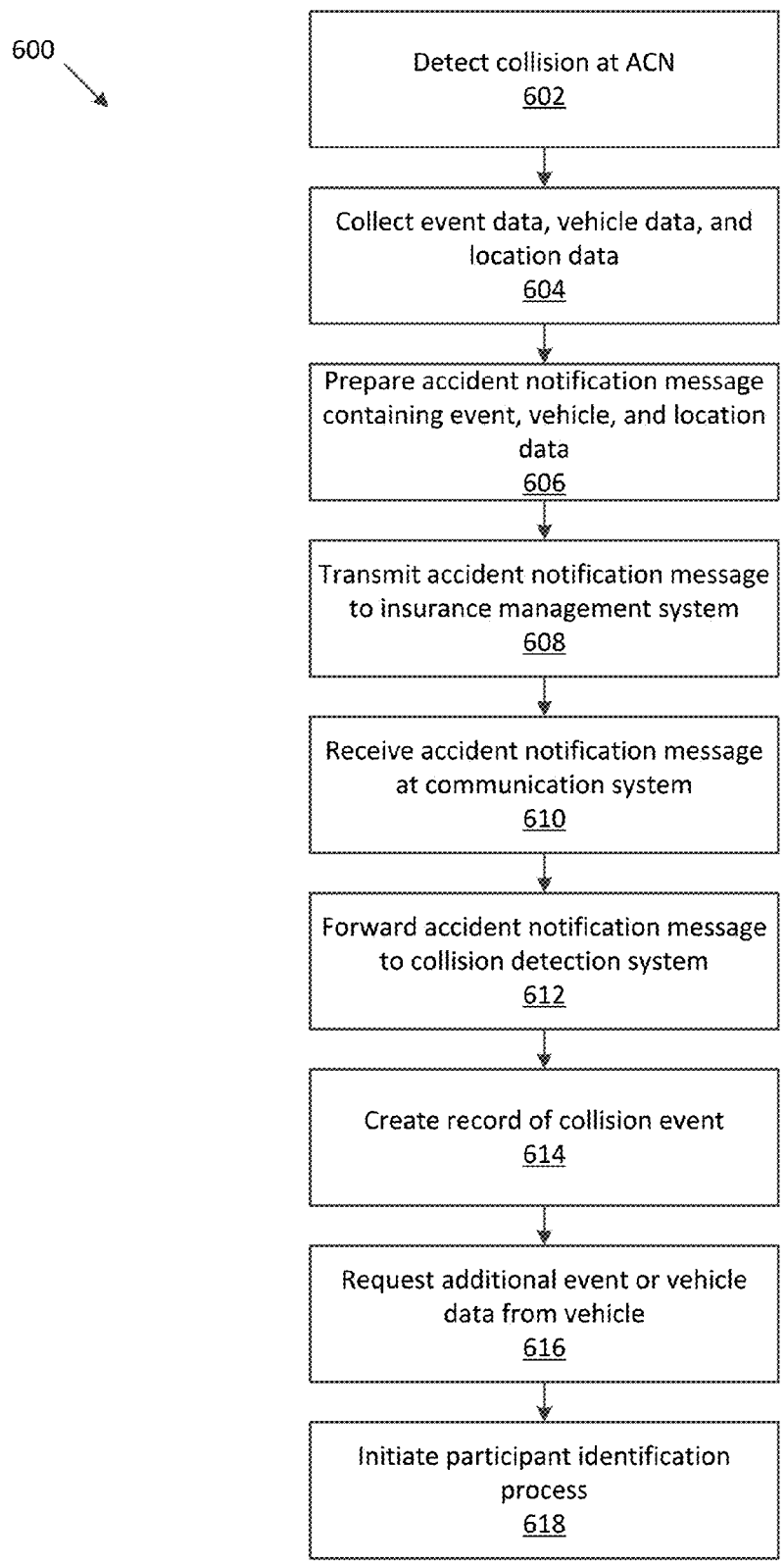
FIG. 6A is a flowchart of example method steps for detecting a collision.

As noted above, the collision detection module 434 (FIG. 4) of the insurance management system 400 may automatically detect collisions based on a collision notification message received from an ACN 408 or CRM 406 at a vehicle 402 as well as based on an analysis of vehicle telematics data received from the MVEDR 410 of the vehicle. In FIG. 6A, a flowchart 600 of example method steps for automatically detecting collisions via an ACN 408 is shown. In this example, an ACN 408 at the vehicle 402 detects a collision (step 602). Accelerometers 420 may measure changes to the speed or velocity of the vehicle 402. For example, the ACN 408 may determine that a collision has occurred where the vehicle 402 undergoes a change in velocity of around 8.0 kilometers per hour (km/h) within an interval of around 150 milliseconds (ms), i.e., a change in velocity of around 4.97 miles per hour (mph) within an interval of around 0.15 seconds.

Upon determination that a collision has occurred, the ACN 408 may collect data for inclusion in a collision notification message (step 604). The ACN 408 may collect, for example, vehicle telematics data from the MVEDR 410, vehicle identification data from the OBD 412, and vehicle location data from the GPS receiver 422. The ACN 408 may prepare a collision notification message that includes the vehicle telematics data, the vehicle identification data, and the vehicle location data (step 606) and transmit the collision notification message to an insurance management system 400 (step 608). In some example implementations, the vehicle 402 may store data that identifies the individual that owns, operates, or is otherwise associated with the vehicle (e.g., a name, a unique identifier, etc.).

A communication module 432 of the insurance management system 400 may receive the collision notification message (step 610) and forward the collision notification message to a collision detection module 434 (step 612). In response to receipt of the collision notification message, the collision detection module 434 may create and store a record of the collision. As an example, the collision detection module 434 may create a new collision record in the event data store 450 that corresponds to the collision (step 614). The collision detection module 434 may also extract the vehicle telematics data, vehicle identification data, and vehicle location data from the collision notification message and store (or otherwise associate) this data with the event record corresponding to the collision.

The collision detection module 434 may, in some example implementations, request additional collision information or vehicle information from the vehicle 402 involved in the collision (step 616). The collision detection module 434 may forward a request for additional information to the communication module 432 of the insurance management system 400. The communication module 432 may then transmit the request to the vehicle 402 where it may be received, for example, at the vehicle communication equipment 418 or the ACN communication equipment 424. In response to receipt of the request, the ACN 408, MVEDR 410, OBD 412, CRM 406, or another vehicle component may obtain the requested information, and the communication equipment 418 or 424 may transmit the requested information back to the insurance management system 400.

Having detected the occurrence of a collision, the process to identify the participants in the collision may be initiated (step 618). As noted above, the CRM 406 may additionally or alternatively be configured to prepare and transmit the collision notification message as described. Accordingly, the CRM 406 may be additionally or alternatively employed to perform the functions and purpose of the ACN 408 with regard to automatically detecting collisions.

Figure 6B:
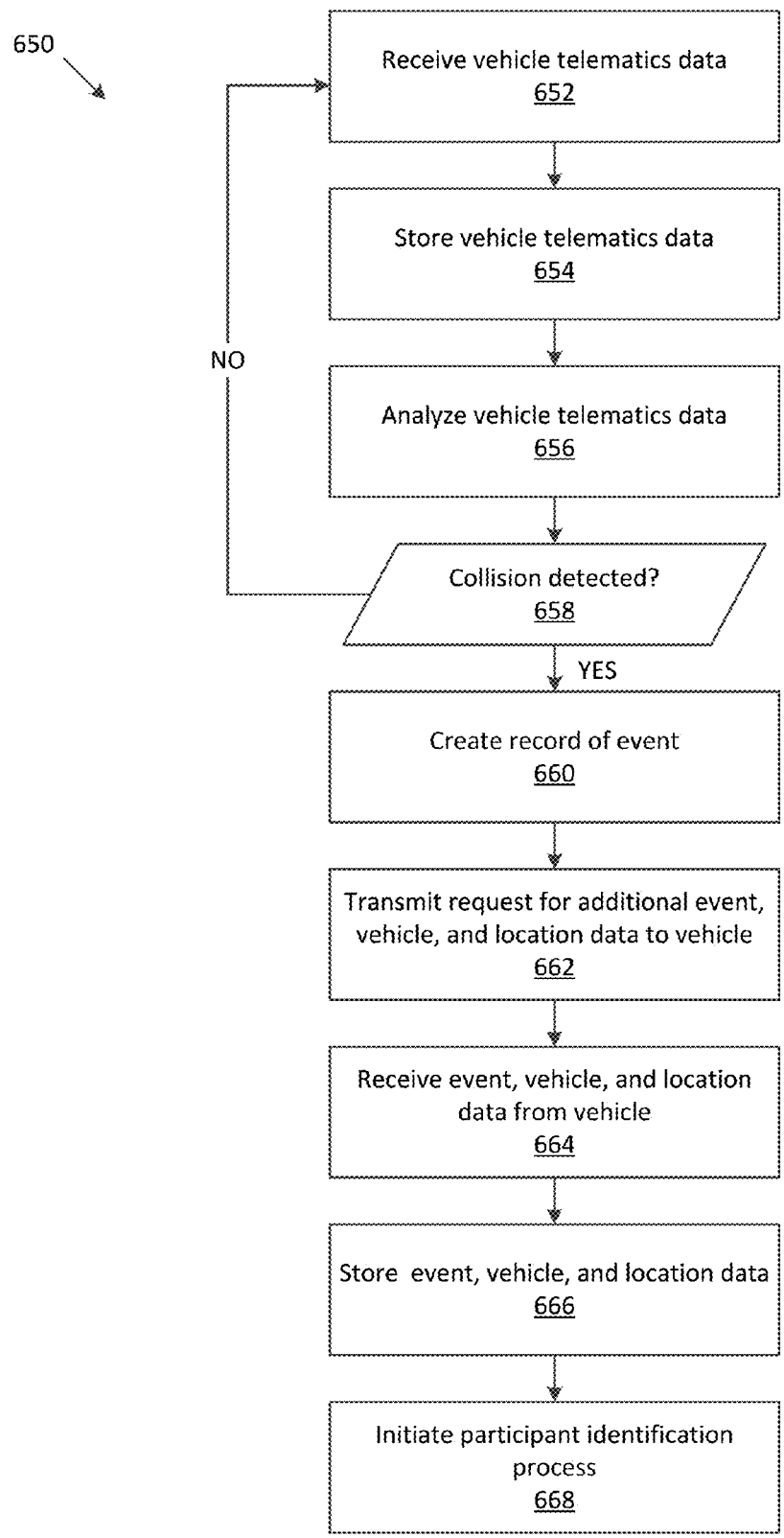
FIG. 6B is a flowchart of alternative example method steps for detecting a collision.

Referring to FIG. 6B, a flowchart 650 of alternative example method steps for automatically detecting collisions is shown. In this alternative example, the collision detection module 434 of the insurance management system 400 automatically detects collisions. A vehicle 402 may continuously transmit vehicle telematics data to the insurance management system 400 where it may be received at the communication module 432 (step 652). The communication module 432 may forward the vehicle telematics data to the collision detection module 434 of the insurance management system 400 or to the vehicle telematics data store 448 of the storage module 441 (step 654). Similar to the approach set forth above, the vehicle telematics data received may include, for example, vehicle velocity or changes to velocity. The vehicle telematics data store 448 may store the vehicle telematics data such that it is related to or otherwise associated with vehicle identification data in the vehicle data store 444 that identifies the vehicle 402 from which the insurance management system 400 received the vehicle telematics data.

The collision detection module 434 may process and analyze the vehicle telematics data to determine whether a collision has occurred (step 656). As an example, the collision detection module 434 may analyze the vehicle telematics data to determine whether a change in velocity occurred at the vehicle within a relative short time period, e.g., a change in velocity of 8 km/h within 150 ms. The collision detection module 434 may process and analyze the vehicle telematics data as it is received from the vehicle 402 or at periodic intervals (e.g., every 30 seconds) after having stored the vehicle telematics data in the vehicle telematics data store 448.

If the collision detection module 434 does not detect a collision (step 658), then steps 652-656 may be repeated until a collision is detected. If the collision detection module 434 does detect a collision (step 658), then the collision detection module may create a record of the collision (step 660). As noted above, the collision detection module may create a new collision record in the event data store 450 that corresponds to the collision. The collision detection module 434 may associate the vehicle telematics data stored at the vehicle telematics data store 448 with the event record stored at the event data store 450. Having associated the vehicle telematics data with the vehicle identification data in the vehicle data store 444, the event data associated with the vehicle telematics data is thus also associated with the vehicle identification data.

In some example implementations, the collision detection module 434 may attempt to obtain additional information from a vehicle 402 involved in the collision. This additional information may include, for example, the vehicle telematics data corresponding to the collision and data identifying the vehicle involved in the collision. Accordingly, the collision detection module 434 may transmit a request to the vehicle 402 involved in the collision for additional event or vehicle data (step 662), and receive the requested data from the vehicle in a response (step 664). As noted above, an insurance management data model may define the relationships between the event and vehicle data received. The event data may include, e.g., the time, date, and location of the collision as well as vehicle telematics data corresponding to the collision; and the vehicle data may include, e.g., vehicle identification data and vehicle diagnostic data. In this way, the insurance management system 400 may utilize the event and vehicle telematics data when determining the participants involved in the collision, determining which participant is likely at fault for the collision, and estimating the vehicle repair cost. Having received the event data and vehicle telematics data, the insurance management system 400 may store the data in the respective data stores 450 and 448 (step 666) and initiate determination of the participants involved in the collision (step 668).

Participant Identification

Figure 7:
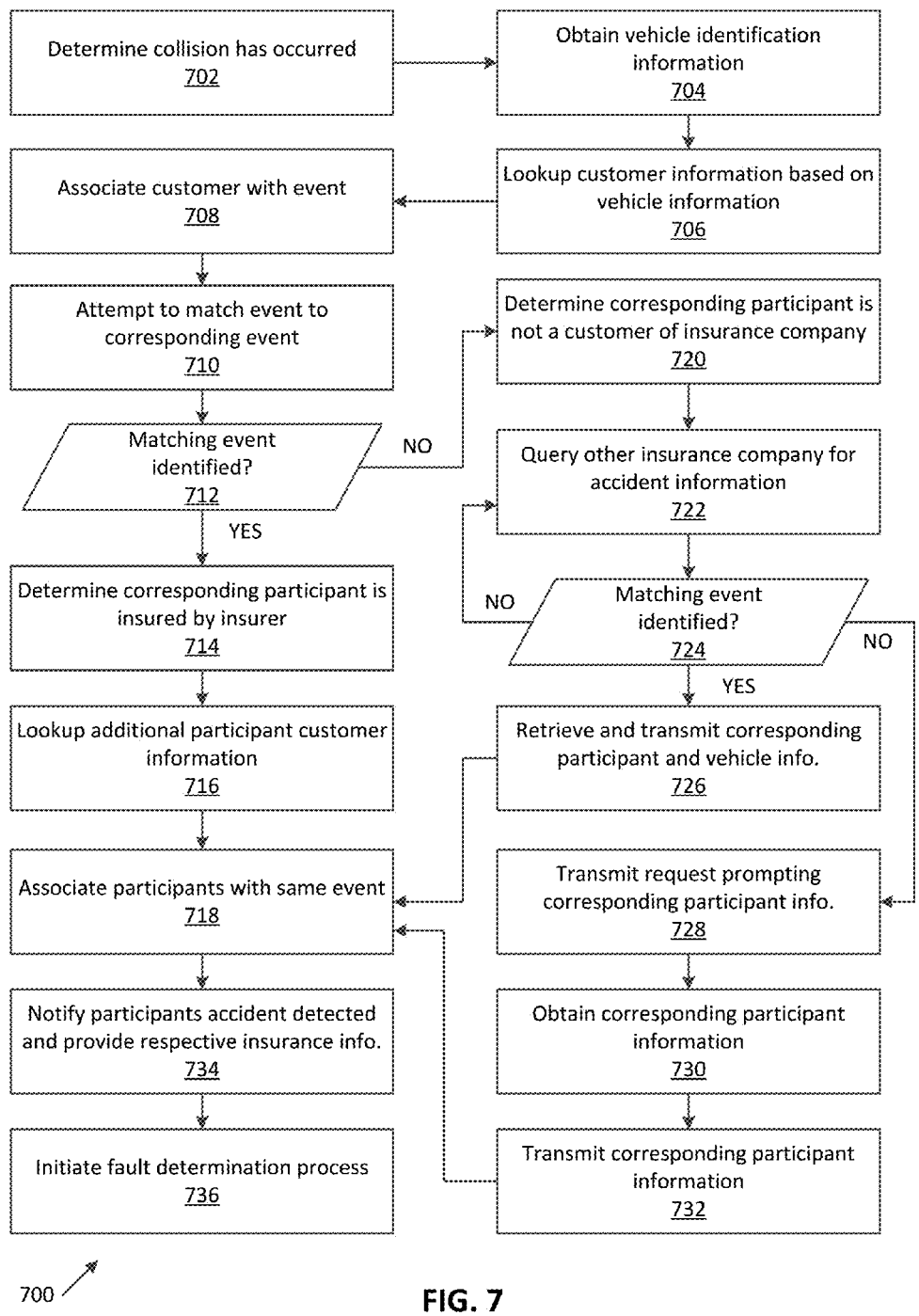
FIG. 7 is a flowchart of example method steps for automatically identifying the participants involved in a collision.

The participant identification module 436 (FIG. 4) of the insurance management system 400 may automate aspects of the process of identifying the participants involved in a vehicle collision. Automated participant identification advantageously streamlines the process of handling, responding to, and processing information about the collision. Referring to FIG. 7, a flowchart 700 of example method steps for automatically identifying participants involved in a vehicle collision is shown.

Upon determination that a collision has occurred (step 702), a participant identification module 436 of the insurance management system 400 may attempt to identify the participants involved in the collision. As noted above, the insurance management system 400 may determine that a collision has occurred by receiving a collision notification message from an ACN 408 or CRM 406 installed and operating at a vehicle 402 or, additionally or alternatively, based on vehicle telematics data collected from the vehicle and analyzed at a collision detection module 434. The participant identification process described below assumes that at least one of the participants is a customer of the insurer that operates the insurance management system 400 such that the storage module 441 of the insurance management system 400 includes customer and vehicle data corresponding to the participant. In some example implementations, the collision notification message received from the vehicle 402 may directly identify the participant where the notification message includes participant identification information, e.g., a name of the individual associated with the vehicle, a customer number, an insurance policy number, or some other unique identifier. In these embodiments, the participant identification module 436 may query the customer data store 442 or the policy data store 446 using the participant identification information included in the collision notification message.

In other example implementations, the participant identification module 436 may attempt to identify a participant indirectly based on vehicle identification data included in the collision notification message. Accordingly, the participant identification module 436 may obtain the vehicle identification data associated with the vehicle involved in the collision (step 704), e.g., vehicle identification data, such as a VIN, included in the collision notification message. The participant identification module 436 may extract the vehicle identification data from the collision notification message and query the vehicle data store 444 using the vehicle identification data. Additionally or alternatively, the vehicle identification data may be included with or otherwise associated with the vehicle telematics data provided by the vehicle 402.

The participant identification module 436 may then query the customer data store 442 for the customer data associated with the vehicle identification data (step 706). As noted above, the insurance management data model may define relationships between the customer data and vehicle data enabling the participant identification module 436 to lookup customer data based on vehicle data. The participant identification module 436 may then associate the customer with the collision (step 708), e.g., by associating the customer record for the participant with the event record for the collision.

The participant identification module 436 may be configured to identify each participant involved in a collision. Accordingly, the participant identification module 436 may attempt to match an event record for the collision with a corresponding event record (step 710). The participant identification module 436 may identify matching event records based on the event data received from the vehicles involved in the collision, e.g., the time, date, and location of the collision. In particular, the participant identification module 436 may determine whether two events have matching times, dates, and locations. If the respective time, date, and location of the event records are the same, then the participant identification module 436 may determine that the event records are associated with and refer to the same collision.

If the participant identification module 436 identifies a matching event record (step 712), then a participant associated with the matching event record is also likely insured by, e.g., a customer of, the insurer that operates the insurance management system 400. Accordingly, the participant identification module 436 may determine that the corresponding participant is a customer (step 714) and query the customer data store 442 and vehicle data store 444 for the customer data vehicle data associated with the corresponding participant and vehicle involved in the collision (step 716). The participant identification module 436 may thus associate the each of the participants with the collision, e.g., by associating the customer records for the participants with the event records for the collision. In this way, the participant identification module 436 associates the incident with each participant involved in the incident (step 718). The participant identification module 436 may repeat steps 710-718 to associate additional participants with the collision.

If both participants are insured by the insurer, then the insurer may automatically provide respective insurance information to each participant. The participant identification module 436 may retrieve the insurance information for the first participant and the insurance information for the second participant from the insurance policy data store 446. The participant identification module 436 may then automatically transmit the insurance policy information for the first participant to the second participant and transmit the insurance policy information for the second participant to the first participant. The insurance policy information may be received at the respective insurance applications 456 operating at the mobile computing devices 404 of the participants. In this way, the insurance management system 400 automates the exchange of insurance information between participants in response to detection of a vehicle collision.

In some situations, one of the participants involved in the collision may not be a customer of the insurer that operates the insurance management system 400. As a result, the participant identification module 436 may not be able to identify a matching event record in the event data store 450. If the participant identification module 436 cannot identify a matching event record in the event data store 450 (step 712), then the participant identification module may determine that the corresponding participant is not a customer of the insurer (step 720) and attempt to identify the corresponding participant using alternative approaches. For example, other insurance companies may maintain insurance management systems 458 that also include a collision detection module and store event records for collisions. As noted above, the insurance management systems 400 and 458 may be remote relative to one another and in signal communication with each other via a network. The participant identification module 436 may transmit a request to a remote insurance management system 458 to determine whether the remote insurance management system includes an event record matching the detected collision (step 722). The participant identification module 436 may include the event data for the collision in the request.

The remote insurance management system 458 may utilize the event data received from the participant identification module 436 when attempting to identify a matching event record, e.g., an event record having a matching time, date, and location. If the remote insurance management system 458 identifies a matching event record (step 724), then the remote insurance management system may retrieve the customer, vehicle, and insurance policy data associated with the corresponding participant and transmit a response to the participant identification module 436 that includes this data. The insurance management system 400 may receive the data associated with the corresponding participant from the remote insurance management system 458 (step 726). The participant identification module 436 may store the data for the corresponding participant at the storage module 441 and associate the data for the corresponding participant with the event record for the collision.

If the remote insurance management system 458 cannot identify a matching event record, then the participant identification module 436 may repeat steps 722-724 to query other remote insurance management systems in an attempt to locate a matching event record for the collision. If a matching event record also cannot be located at other remote insurance management systems, the participant identification module 436 may transmit a request to one of the identified participants that prompts the identified participant to obtain the information from the corresponding participant involved in the collision (step 728). The participant identification module 436 may transmit the request via the communication module 432, and the request may be received at the insurance application 456 operating at the mobile computing device 404 of the identified participant. Prompted by the request, the identified participant may obtain the participant, vehicle, and insurance information from the corresponding participant (step 730). In some example implementations, the corresponding participant may automatically transmit the participant, vehicle, and insurance information using a mobile computing device 404. For example, the respective mobile computing devices 404 of each user may store participant, vehicle, and insurance data, and this data may be wirelessly exchanged between the mobile computing devices where the exchange is initiated by touching the mobile computing devices together.

Upon receipt of the information from the corresponding participant, the insurance application 456 may transmit the information to the insurance management system 400 where the participant identification module 436 may receive the information via the communication module 432 (step 732).

The participant identification module 436 may store the participant, vehicle, and insurance information received in the storage module 441 and associate the information with the event record for the collision (step 718). In some example implementations, once both participants have been identified, the participant identification module 436 may transmit a notification to each identified participant (step 734). The notification message may indicate that the collision was detected, that the participants were identified, and that the insurance management system 400 is automatically processing a response to the collision. The notification message may also include the respective insurance information for the participants (e.g., name of insurer, insurance policy number, etc.). The communication module 432 of the insurance management system 400 may transmit the notification message to the insurance applications 456 at the mobile computing devices 400. An insurance application 456 may also be configured to enable a participant to indicate that there were no additional participants involved in the collision, e.g., that the collision involved the participant and a stationary object such as a wall or parked vehicle. Once the participant identification module 436 determines the participants involved in the collision, the participant identification module may initiate an attempt to determine which one of the participants was at fault for the incident (step 736).

Automated Fault Determination

Figure 8:
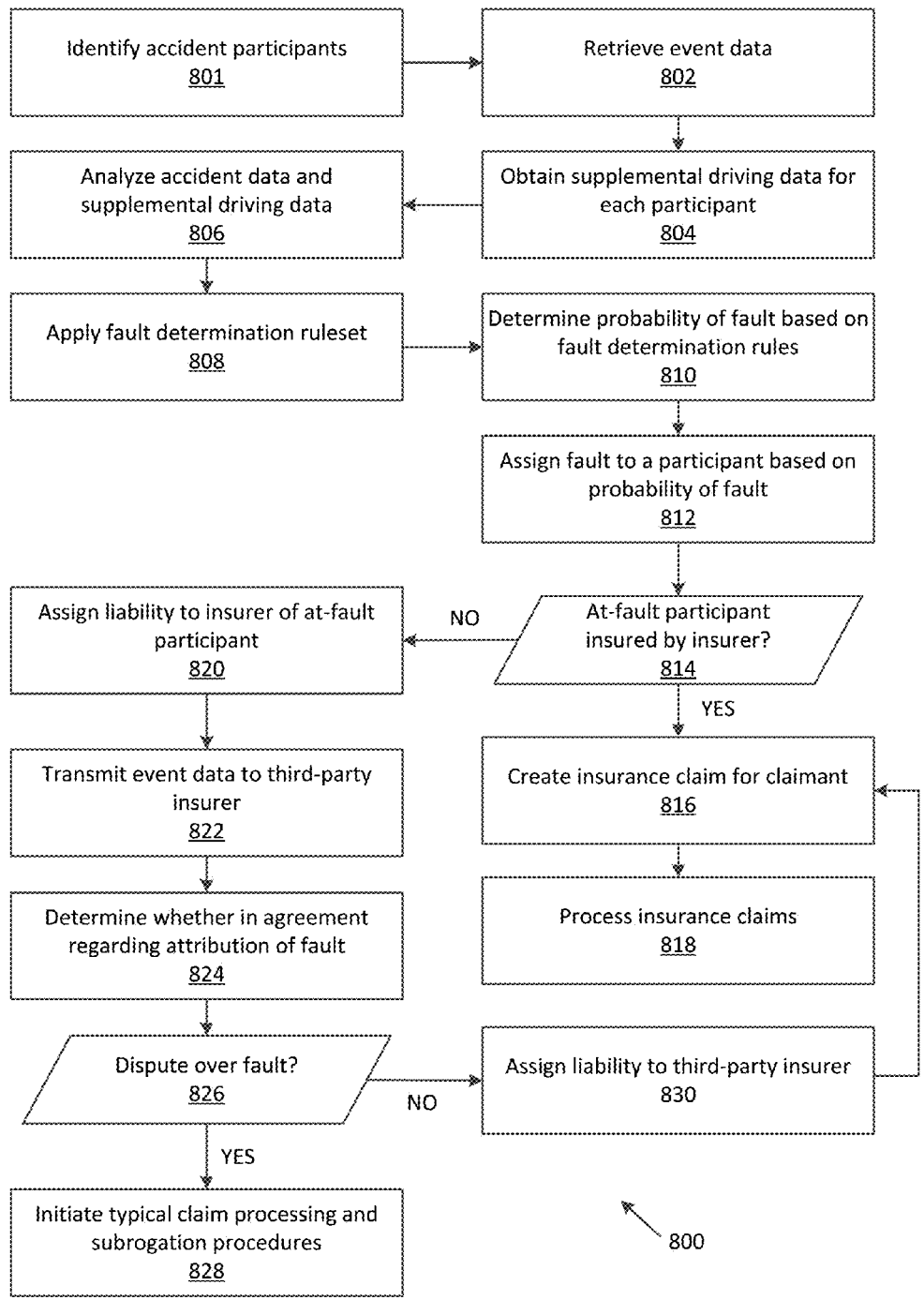
FIG. 8 is a flowchart of example method steps for automatically determining and attributing fault to one of the participants involved in a collision.

The insurance management system 400 (FIG. 4) may include a fault determination module 438 that automates aspects of determining and attributing fault to one of the participants involved in the collision. Referring to FIG. 8, a flowchart 800 of example method steps for automatically determining and attributing fault to one of the participants is shown. Once the participant identification module 436 identifies the participants involved in a collision (step 801), a fault determination module 438 may attempt to determine which participant involved in the incident is the at-fault participant. The at-fault participant may be the participant to which liability for the collision is assigned. As discussed further below, the fault determination module 438 may determine a respective fault probability for each participant involved in the collision and identify one of the participants as the at-fault participant based on the fault probabilities. A fault probability may be a value (e.g., a percentage) that quantifies the likelihood a participant is the at-fault participant.

The automated fault determination 438 module may receive event information from the respective MVEDRs 410 of the vehicles 402 involved in the collision (step 802). The fault determination module 438 may receive the event data via the communication module 432 of the insurance management system 400. In some example implementations, the fault determination module 438 may obtain supplemental driving data related to the participants involved in the collision (step 804). The supplemental driving data may include, for example, driver history data and claim history data respectively associated with the participants. Driving history data may indicate previous incidents that the drivers have been involved in or citations the driver has received for moving violations. Claim history data may indicate, for instance, previous insurance claims filed against the participant. The fault determination module 438 may obtain the driving history data or the claim history data from respective data stores of the storage module 441 or, additionally or alternatively, in response to requests for the supplemental driving data from one or more remote third-party systems 468 in signal communication with the insurance management system 400.

The fault determination module 438 may analyze the event data and the supplemental driving data to identify the at-fault participant and to determine the fault probability values (step 806). The fault determination module 438 may apply a fault determination ruleset 456 (step 808) when analyzing the event data and supplemental driving data. The fault determination ruleset may be configured, for example, to apply the rules of the road to the vehicle telematics received from the vehicles. In one example, the vehicle telematics data may indicate that prior to the collision, one of the vehicles made a left turn in front of an oncoming vehicle. Based on the telematics data, in this example, the fault determination ruleset may indicate that the left-turning vehicle is at fault or at least likely to be at fault. In another example, the vehicle telematics data may indicate that prior to the collision, one of the vehicles was moving and the other vehicle was not moving. Based on the vehicle telematics data, in this other example, the fault determination ruleset may indicate that the moving vehicle is at fault or at least likely to be at fault. In an additional example, the vehicle telematics data may indicate that prior to the collision, one of the vehicles was exceeding the speed limit. Based on the vehicle telematics data, in this additional example, the fault determination ruleset may indicate that the speeding vehicle is likely to be at fault. In response, the fault determination module may increase the probability that the speeding vehicle was at fault. In a further example, the vehicle telematics data may indicate that prior to the collision, each vehicle was moving but one of the vehicles suddenly decelerated causing the other vehicle to collide with the vehicle. In this further example, the fault determination ruleset may indicate that the decelerating vehicle is at fault or at least likely to be at fault. Historical data may also be employed as a factor to determine fault. For example, if the historical data indicates that one of the individuals has been more at fault in previous accidents, then the fault determination module may initially guess that the individual is at fault for a present accident. Accordingly, the fault determination ruleset may be implemented, for example, as a decision tree or decision table, using conditional statements or switch statements, and combinations thereof. It will be appreciated that various approaches may be selectively employed for implementing the fault determination ruleset.

Based on the fault determination ruleset 456, the fault determination module 438 may generate one or more fault probability values that respectively indicate the likelihood each participant is at fault for the collision (step 810). The fault determination module 438 may then attribute fault to one of the participants based on the fault probability values (step 812). As an example, the fault determination module 438 may attribute fault to the participant associated with the higher fault probability value.

In some example implementations, the fault determination module 438 may be configured to determine that fault cannot be accurately attributed to one participant over the other. For example, the fault determination module 438 may conclude that fault cannot be attributed where the fault probability values for each participant are equal or where the difference between the fault probability values does not exceed a predetermined threshold. As an example, the fault determination module 438 may conclude that fault can be accurately attributed where the respective fault values are 75% likelihood of fault versus 25% likelihood of fault—a fifty percentage point difference—but that fault cannot be accurately attributed where the respective fault values are 53% likelihood of fault versus 47% likelihood of fault—only a six percentage point difference. Example implementations of the fault determination module may be configured to determine that fault can or cannot be determined using additional or alternative thresholds.

If the insurer that operates the insurance management system insures the at-fault party (step 814), then the fault determination module 438 may assign liability to the insurer, create an insurance claim for the claimant (step 816), and process the insurance claim (step 818). Processing the insurance claim may include, for example, estimating the cost of repairs for damage to the vehicle associated with the claimant and providing a settlement offer to the claimant. Processing an insurance claims will be discussed in further detail below.

If the insurer does not insure the at-fault participant (step 814), e.g., where a third-party insurer insures the at-fault participant, the fault determination module 438 may assign liability to the at-fault participant (step 820) and contact a third-party insurer that insures the at-fault participant to confirm the determination and attribution of fault. The fault determination module 438 may transmit the event data and fault probability values to a remote insurance management system 458 of the third-party insurer (step 822). The remote insurance management system 458 may also be configured to automatically determine fault based on the event data, supplemental driving data, and a fault determination ruleset. In some circumstances, the remote insurance management system 458 may be configured to apply the same fault determination ruleset as the fault determination module 438. In other circumstances, the remote insurance management system 458 may apply an alternative fault determination ruleset to identify the at-fault participant.

The remote insurance management system 458 of the third-party insurer may likewise analyze the event data and supplemental driving data to identify the at-fault participant. The third-party insurer may transmit a fault determination response back to the fault determination module 438 indicating whether the third-party insurer agrees with the determination that the at-fault participant is insured by the third-party insurer. The fault determination module 438 may analyze the response from the remote insurance management system 458 to determine whether the third-party insurer agrees with the determination and attribution of fault (step 824). If the remote insurance management system 458 indicates disagreement with the determination and attribution of fault, e.g., if there is a dispute over fault (step 826), then typical claim subrogation procedures may be initiated to determine whether the insurer or the third-party insurer should assume liability for the incident (step 828). If, however, the third-party insurer agrees that the participant insured by the third-party is at fault, e.g., if there is not dispute over fault (step 826), then the fault determination module 438 may automatically assign liability to the third-party insurer (step 830), create an insurance claim for the claimant (step 816), and process the insurance claim (step 818). Automatically creating a claim for the claimant may include automatically filing a claim against the at-fault participant. It will be appreciated that a claim may also be automatically created and filed for the at-fault participant. As noted above, processing the claim may include estimating a total repair cost and providing a settlement offer. Where liability for the collision is assigned to the third-party insurer, processing the claim may also include subrogation of the insurance claim.

Damage Estimation

Figure 9:
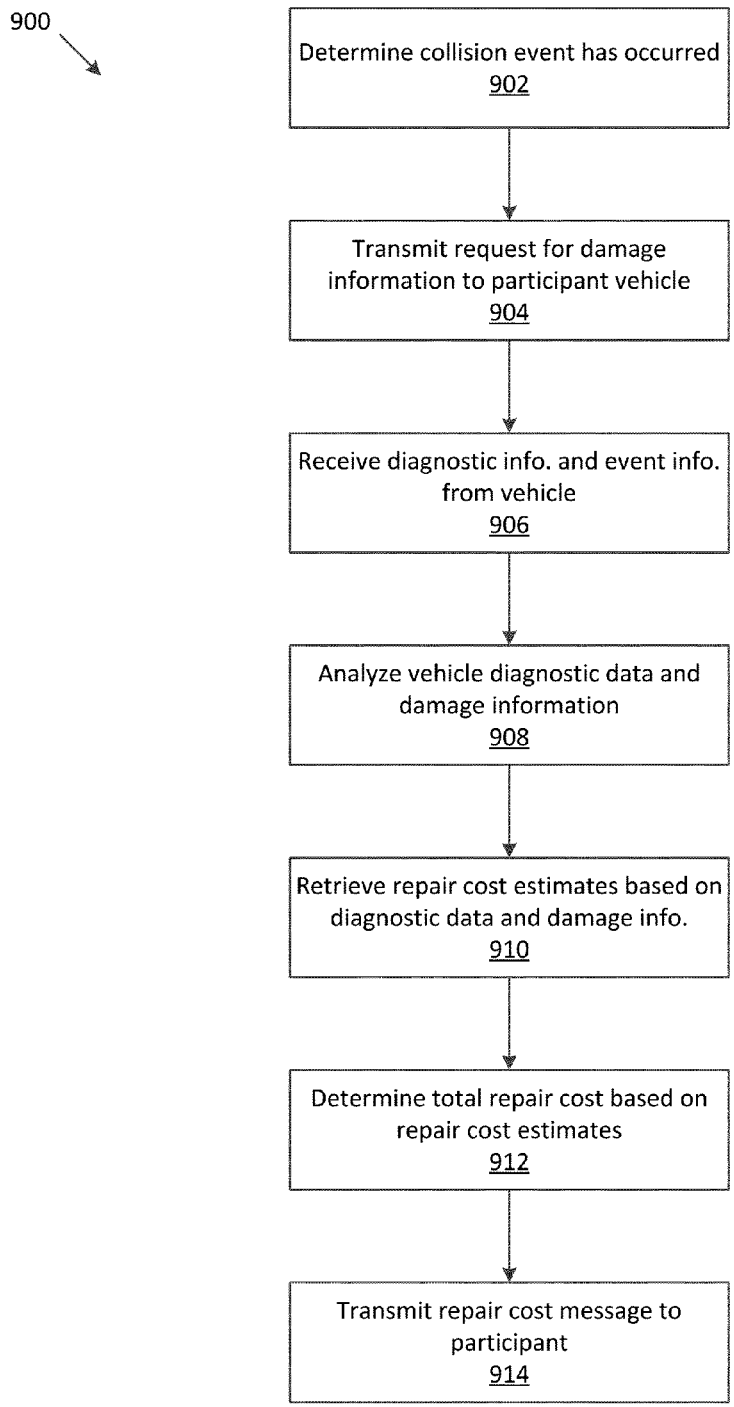
FIG. 9 is a flowchart of example method steps for automatically determining a total estimated repair cost for a vehicle involved in a collision.

As noted above estimating the cost to repair the damage to a vehicle 402 (FIG. 4) involved in the collision may be part of the claims processing procedure. The insurance management system 400 may include a repair cost estimation module 440 that automates aspects of the repair cost estimation process. FIG. 9 shows a flowchart 900 of example method steps for automatically estimating vehicle repair cost. Having detected that a collision has occurred (step 902), the repair cost estimation module 440 may initiate the process of estimating the cost to repair the vehicle 402 involved in the collision. The repair cost estimation module 440 may determine a total estimated repair cost based at least in part on diagnostic data and vehicle telematics data provided by the vehicle 402 involved in the collision. As discussed above, the OBD 412 of the vehicle 402 may provide the diagnostic data and the MVEDR 410 may provide the vehicle telematics data. The repair cost estimation module 440 may transmit a request to the vehicle 402 for the diagnostic and vehicle telematics data in response to detecting a collision involving the vehicle (step 904). Additionally or alternatively, the vehicle 402 may be configured to automatically transmit the diagnostic and vehicle telematics data to the insurance management system 440 in response to a collision detected at the vehicle. The diagnostic and vehicle telematics data may be received at the repair cost estimation module 440 via the communication module 432 of the insurance management system (step 906). The storage module 441 of the insurance management system 400 may store the diagnostic data in the repair data store 452 and the vehicle telematics data in the vehicle telematics data store 448. The diagnostic data and vehicle telematics data may be associated with the event record for the collision such that the repair cost estimation module 440 may query the respective data stores for the data during the cost estimation process.

The repair cost estimation module 440 may analyze the diagnostic and vehicle telematics data (step 908). Analysis of the diagnostic data and vehicle telematics data may include comparing the diagnostic data and vehicle telematics data received from the vehicle 402 to repair data stored in the repair data store 452 of the insurance management system 400. The repair data may represent reference information that associates diagnostic data and vehicle telematics data with repair cost estimates. The repair cost estimation module 440 may query these repair cost estimates from the repair data store 452 based on the diagnostic data and vehicle telematics data received from the vehicle 402 (step 910). As noted above, the diagnostic data may include information that identifies which vehicle systems, components, and parts were damaged in the collision. The repair data store 452 may include repair estimates that indicate the cost of repairing or replacing the various systems, components, and parts of a vehicle. Accordingly, the repair cost estimation module 440 may retrieve the repair estimates for the any damaged systems, components, or parts identified in the diagnostic data and determine a total estimated repair cost based, at least in part, on those repair estimates.

Additionally or alternatively, the repair cost estimation module 440 may estimate a total repair cost based, at least in part, on the vehicle telematics data received from the vehicle 402. The repair data store 452 may include repair estimates that are correlated with vehicle speeds. The repair cost estimation module 440 may determine the speed at which the vehicle was traveling when the collision occurred based on the vehicle telematics data received from the vehicle 402. The repair cost estimation module 440 may query the repair data store 452 for repair estimates that correlate to the speed of the vehicle 402 when the collision occurred.

The repair cost estimation module 440 may determine a total repair estimate based on the diagnostic data and the vehicle telematics data individually or in combination. The repair cost estimation module 440 may also use additional or alternative types of data individually or in combination with the diagnostic and vehicle telematics data to determine a total repair estimate. As noted above, the repair cost estimation module 440 may obtain repair estimates from the repair data store 452 of the insurance management system 440. Additionally or alternatively, the repair cost estimation module 440 may retrieve repair estimate from a remote third-party system 468 via a network. In these situations, the repair cost estimation module 440 may transmit via the communication module 432 the diagnostic data, vehicle telematics data, or other data to the remote third-party system 468 and receive repair estimates from the remote third-party system in response.

Based on the repair estimates received, the repair cost estimation module 440 may generate a total estimated repair cost for the vehicle 402 involved in the collision (step 912). The repair cost estimation module 440 may then transmit via the communication module 432 a repair cost message that includes the total estimated repair cost (step 914). An insurance application 456 operating at the mobile computing device 404 of the participant may receive the repair cost message and display the total estimated repair cost to the participant. It will be appreciated that the repair cost estimation module 440 may estimate the cost to repair any of the vehicles involved in the collision including the vehicle of the at-fault participant as well as the vehicle of the participant that was not at fault. It will be appreciated that aspects of the disclosure may be applicable to other types of insured items. For example, sensors may detect when a window breaks such that a claim may automatically be generated.

Claims Processing

Figure 10:
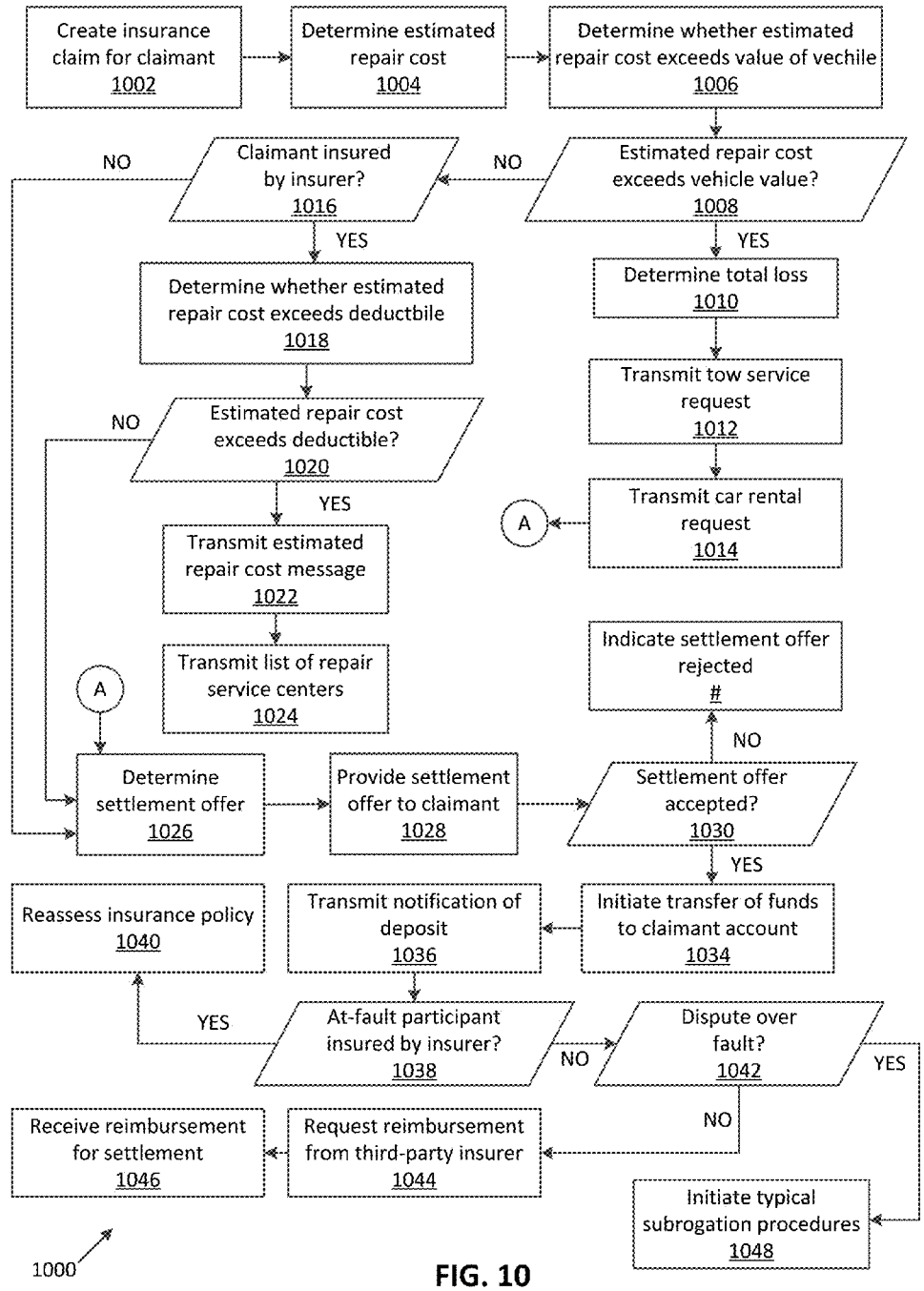
FIG. 10 is a flowchart of example method steps for automatically processing an insurance claim resulting from a collision.

The insurance management system 400 (FIG. 4) may include a claims processing module 442 that automates other aspects of the claims processing procedure. Referring to FIG. 10, a flowchart 1000 of example methods steps for automating aspects of the claims processing procedure is shown. As noted above, the claims processing procedure may include automatically creating an insurance claim for a claimant (step 1002) and automatically determining a total estimated repair cost for the damaged vehicle 402 (step 1004). As discussed further below, the claims processing procedure may include providing a settlement offer to one of the participants. As used in the description below, a claimant may be a participant for whom an insurance claim has been created as well as a participant to whom a settlement offer is provided. The claimant may or may not be the at-fault participant and may be insured by the insurer that operates the insurance management system 400 or by a third-party insurer.

When processing insurance claims, the claims processing module 442 may determine whether the total estimated repair cost exceeds the total value of the vehicle 402 (step 1006). The claims processing module 442 may obtain a total estimated value of the vehicle based on vehicle profile data for the vehicle 402 (e.g., make, model, year, mileage, etc.). The repair data store 452 of the storage module 441 may include market value price estimates for vehicles of various makes, models, and years having various mileage readings. Additionally or alternatively, the claims processing module 442 may obtain the market value price estimates from a remote third-party system 468 via a network. The claims processing module 442 may provide the vehicle profile data to the remote third-party system 468 and receive the market value price estimates in response.

If the total estimated repair cost exceeds the total estimated value of the vehicle 402 (step 1008), then the claims processing module 442 may determine that the vehicle is a total loss (step 1010). When the damaged vehicle 402 is determined to be a total loss, the claims processing module 442 may automatically initiate transmission of a tow service request to the system 466 of a vehicle tow service (step 1012). The tow service request may include the geographic location of the vehicle 402. In response to receipt of the tow service request, a tow service provider may dispatch a tow truck to the geographic location of the vehicle 402 in order to retrieve the damaged vehicle. The claims processing module 442 may also automatically initiate transmission of a vehicle rental request to the system 464 of a remote vehicle rental service (step 1014). The rental request may include the geographic location of the claimant. In response to receipt of the rental request, a vehicle rental service provider may dispatch a rental vehicle to the geographic location of the claimant in order to deliver the rental vehicle to the claimant.

If the total estimated repair cost does not exceed the value of the vehicle 402, then a settlement offer may be provided to the claimant. Before the claims processing module 442 provides a settlement offer to the claimant, the claims processing module may determine whether the claimant is insured by the insurer (step 1016). In this way, the claims processing module 442 may determine whether the total estimated repair cost exceeds the deductible for the claimant (step 1018). If the claimant is insured by the insurer (step 1016) and the total estimated repair cost exceeds the deductible for the claimant (step 1020), then the claims processing module 442 may not provide a settlement offer to the claimant. Instead, the claims processing module 442 may transmit a repair cost message to the claimant (step 1022) that indicates the total estimated repair cost and identifies the insurance deductible of the claimant. The claims processing module 442 may transmit the repair cost message to the insurance application 456 at the mobile computing device 404 of the claimant.

The claims processing module 442 may also attempt to identify repair service centers located near the claimant and provide a list of repair service centers within a predetermined radius (e.g., 5 miles) of the claimant (step 1024). The insurance application 456 operating at the mobile computing device 404 may receive and display the list of recommended repair service centers. The claims processing module 442 may utilize the location data received from the vehicle 402 to identify repair service centers located within a predetermined radius (e.g., 5 miles) relative to the location of the claimant. The repair data store 452 of the storage module 441 may also store information relating to repair service centers and their corresponding geographic locations. The claims processing module 442 may query the repair data store 452 for a list of repair service centers in the vicinity of the claimant based on the geographic location of the claimant. Additionally or alternatively, the list of repair service centers may be stored at a remote third-party system 468, and the claims processing module 442 may retrieve the list of repair service centers the vicinity of the claimant from the remote third-party system 468 via a network. In some example implementations, the claims processing module may identify one or more of the repair service centers as a preferred repair service center. The insurance application may be configured to receive a selection from the user (e.g., via a button) indicating which repair service center the user intends to patronize. The insurance application may transmit the selection to the insurance management system, and the insurance management system may apply a discount to the insurance policy for the customer as a reward for selecting a preferred repair service center.

The claims processing module 442 may also be configured to automate some steps of the claims resolution process including, for example, automatically determining a settlement offer for the claimant (step 1026). The claims processing module 442 may determine a settlement offer for the claimant where, for example, the vehicle is a total loss (step 1008), where the total estimated repair cost exceeds the deductible for the claimant (step 1020), or where the claimant is not insured by the insurer (step 1016). The claims processing module 442 may determine the settlement offer based, at least in part, on the total estimated repair cost. The claims processing module 442 may provide the settlement offer to the claimant (step 1028), e.g., by transmitting a settlement offer to the insurance application 456 at the mobile computing device 404 of the claimant. The insurance application 456 may display the settlement offer to the claimant and prompt the claimant to either accept or reject the settlement offer.

The claimant may provide user input indicating whether the claimant accepted or rejected the settlement offer, and the insurance application 456 may transmit the user input back to the claims processing module 442. If the user input indicates that the claimant did not accept the settlement offer (step 1030), then the claims processing module 442 may update the insurance claim to indicate the claimant rejected the settlement offer (step 1032) and the typical claims resolution process may proceed.

If the user input indicates that the claimant accepted the settlement offer (step 1030), then the claims processing module 442 may initiate a transfer of funds into a bank account associated with the claimant (step 1034). The claims processing module 442 may transmit a request to the system 462 of a banking institution to transfer funds corresponding to the settlement offer from a bank account associated with the insurer to the bank account associated with the claimant. Upon confirmation from the banking system 462 that the funds have been transferred, the claims processing module 442 may transmit a deposit notification message to the claimant indicating that the settlement funds have been deposited into the bank account associated with the claimant (step 1036). The insurance application 456 at the mobile computing device 404 may receive the deposit notification message and display the message to the claimant.

Although an insurer provides a settlement offer to a claimant, the insurer may not be liable for the collision. For example, if the insured is not the at-fault party, e.g., if the at-fault party is insured by a third-party insurer, the insurer may provide the settlement funds to the insured and then proceed with subrogation to recover the settlement funds from the third-party insurer. Accordingly, the claims processing module 442 may additionally determine whether the insurer insures the at-fault participant (step 1038) in order to determine whether the insurer should proceed with subrogation. If the insurer insures the at-fault participant, then there may be no need for subrogation as liability may already be assigned to the insurer. In this regard, where the insurer insures the at-fault participant, the claims processing module 442 may flag the insurance policy of the at-fault participant such that the insurer may subsequently reassess the insurance policy (step 1040), e.g., by applying penalties or adjusting insurance premiums upon renewal.

Where the insurer does not insure the at-fault participant, the insurer may engage in subrogation with the third-party insurer. The claims processing module 442 may be configured to automate aspects of the subrogation process. For example, if there is no dispute over fault attribution (step 1042), the claims processing module 442 may transmit a request to a remote insurance management system 458 operated by the third-party insurer (step 1044). In response to receipt of the request, the third-party insurer may provide funds to reimburse the insurer for the settlement funds provided to the claimant. The insurer may receive the reimbursement funds (step 1046) via, for example, a transfer of the reimbursement funds from a bank account associated with the third-party insurer to a bank account associated with the insurer. The claims processing module 442 may receive a deposit notification message from the remote insurance management system 458 indicating the transfer of funds. In response to receipt of the deposit notification from the remote insurance management system 458, the insurance management system 400 may designate or identify the insurance claim as closed or settled. In this way, the claims processing module 442 of the insurance management system 400 may advantageously subrogate insurance claims with a third-party insurer automatically. If there is a dispute over fault (step 1042), then the claims processing module 442 may initiate typical subrogation procedures (step 1048).

The claims processing module 442 may additionally or alternatively be configured to allocate settlement payments between the insurer and third-party insurers. In some example embodiments, the insurance management system may charge a settlement fee when a claim is settled using the system. The insurance management system may also employ the fault determination probabilities to determine respective portions of a settlement payment shared between one insurer and another insurer. As an example, if the insurers agree that one of the drivers was 35% at fault and the other driver was 65% at fault, then one of the insurers may agree to provide 35% of the settlement payment, and the other insurer may agree to provide 65% of the settlement payment. Furthermore, in some example embodiments, insurers may maintain debit/credit accounts, and the claims processing module may initiate a credit or debit to the respective accounts for the insurers. Accordingly, in this example, payments between insurers may be a matter of bookkeeping in which the accounts indicate how much money one insurer owes to or is owed by another insurer. Actual payments may thus be provided or received at periodic intervals based on the balances of the debit/credit accounts.

Automated Disturbance Detection for Parked Vehicles

In view of the disclosures above, it will be appreciated that a system may be configured to detect other types of physical disturbances such as, for example, when a moving vehicle impacts a parked vehicle, when a vehicle is being towed or stolen, or when a vehicle is otherwise tampered with or disturbed. Bumping or otherwise physically disturbing the vehicle may trigger the collision and response components installed at the vehicle as well as a message providing notification of the physical disturbance. As used in this description, a parked vehicle refers a vehicle that is not moving and is not running (e.g. not turned on). For comparison, a stopped vehicle or a standing vehicle refers to a vehicle that is not moving but is running (e.g., turned on), and a moving vehicle may refer to a vehicle that is currently in motion regardless of whether the vehicle is running or in motion under its own power. For example, a vehicle may be moving but not running when the vehicle is being towed or stolen, pushed, affected by gravity (e.g., where an individual forgets to set the parking brake and the vehicle runs away). As used in this disclosure a running vehicle refers to a vehicle that has achieved ignition such that the engine of the vehicle is currently operating. It will be appreciated that the disclosures provided in this description may be employed to detect a collision with a vehicle whether that vehicle is parked, standing, stopped, or moving. As an example, the system may be configured to determine that the vehicle is being towed or stolen when the vehicle is determined to be moving but not running. It will be recognized as indicated above, however, that the vehicle may be moving and not running in other situations where the vehicle is not being towed (e.g., stolen, pushed).

Figure 11:
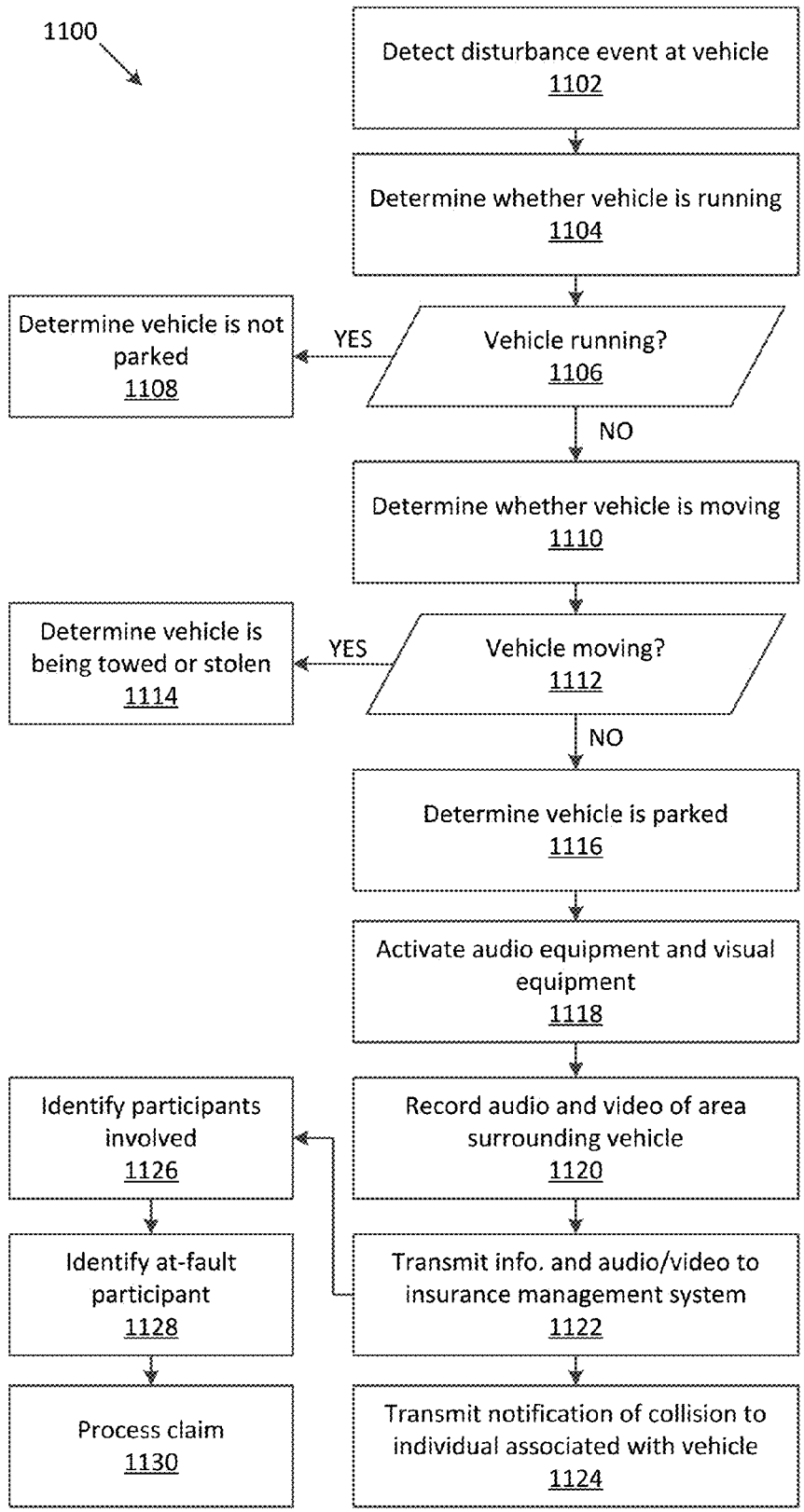
FIG. 11 is a flowchart of example method steps for automatically detecting and responding to a collision involving a parked vehicle.

Referring to FIG. 11, a flowchart 1100 of example method steps for detecting and responding to a physical disturbance event (e.g., a collision) involving a parked vehicle is shown. The description below refers to a collision event by way of example, but aspects of the disclosure may be applicable to other types of physical disturbance events. The detection and response components of a parked vehicle may be configured to detect and respond to a collision at the vehicle (step 1102) even when the vehicle is parked. As an example, a CRM 406 (FIG. 4) of the vehicle 402 may be configured to enter a low power mode (e.g., a sleep mode, a standby mode, a hibernation mode) when the vehicle is parked. In response to receipt of a notification that a collision has occurred at the vehicle 402, the CRM 406 may enter an active mode (e.g., resume, wake up) in order to respond to the vehicle collision.

The accelerometers 420 of the ACN 408 or other sensors 430 at the parked vehicle 402 may detect a collision as described above. In response to the collision, the ACN 408 or other sensors 430 may provide a notification to the CRM 406 that a collision has occurred. In response to receipt of the notification, the CRM 406 may carry out various steps in order to respond to the collision. It will be appreciated that the ACN 408 or other sensors may provide notification of a collision that has occurred at the vehicle 402 when the vehicle is both running and not running as well as when the vehicle is both moving and not moving.

As shown by way of example in FIG. 11, the CRM 406 may determine if the vehicle 402 was running when the disturbance event occurred (step 1104), e.g., by querying the OBD 412 or MVEDR 410. If the vehicle 402 was running when the disturbance event occurred (step 1106), then the CRM 406 may determine that the vehicle 402 was not parked when the disturbance event occurred (step 1108), e.g., that the vehicle was moving, stopped, or standing when the disturbance event occurred. If the CRM 406 determines that the vehicle 402 was not running when the disturbance event occurred (step 1106), then the CRM may determine whether the vehicle was moving when the disturbance event occurred (step 1110). The CRM 406 may determine whether the vehicle 402 was moving also, e.g., by querying the OBD 412 or MVEDR 410. If the CRM 406 determines that the vehicle 402 was moving but not running when the disturbance event occurred (step 1112), then the CRM may determine that the vehicle is being towed or stolen (step 1114). If the CRM 406 determines that the vehicle 402 was not moving (step 1112) and not running (step 1106) when the disturbance event occurred, then the CRM may thus determine that the vehicle was parked when the disturbance event occurred (step 1116).

In response to detection of the disturbance event, the CRM 406 may initiate various steps in order to respond to the disturbance event. The CRM 406 may, for example, activate one or more recording devices 414 or 416 at the vehicle 402 (step 1118), e.g., the A/V equipment, to record the area surrounding the vehicle for a period of time following the disturbance event (step 1120). The recording devices 414 or 416 may record the area surrounding the vehicle 402 following detection of the disturbance event for a predetermined period of time, e.g., for 30 seconds after detection of the disturbance event. In this way, the recording devices 414 or 416 may capture and retain information regarding the circumstances of the disturbance event including possibly information identifying a vehicle that collided with the parked vehicle 402 (e.g., a license plate, vehicle make, model, color, etc.), information identifying an individual tampering with the vehicle, or information indicating that the vehicle is being towed or stolen. It will be appreciated that the recording devices 414 or 416 may also be employed to record audio or video for collisions detected when the vehicle is moving.

The CRM 406 may also generate and transmit a collision notification message to an insurance management system 400 (step 1122). The collision notification message may include information relating to the vehicle 402 and the collision including, for example, vehicle identification data (e.g., VIN, make, model, year, etc.), location data (e.g., GPS coordinates), event data (e.g., audio or video recordings), and diagnostic data. The communication equipment 418 at the vehicle 402 may transmit the collision notification message to the insurance management system 40 via a network (e.g., cellular, IP-based, etc.) The communication module 432 of the insurance management system 400 may receive the collision notification message and forward the message to other modules at the insurance management system for further processing.

As an example, the insurance management system 400 may leverage the GPS data received from the vehicle to identify high-risk areas based on what type of area it is. For example, the insurance management system may identify highly dense urban areas as relatively riskier compared to less dense rural areas. As another example, the insurance management system may identify large parking lots in commercial areas as relatively riskier compared to driveways in residential areas. The insurance management system 400 may also leverage the velocity of impacts to identify relatively high-risk areas. For example, areas in which low velocity impacts occur may be less risky than areas in which high velocity impacts occur. It will be recognized that the insurance management system may leverage additional or alternative types of information from the vehicles to identify additional or alternative aspects of the areas in which the vehicles travel and reside.

The participant identification module 436 of the insurance management system 400 may identify the owner of the parked vehicle 402 based, e.g., on the vehicle information (e.g., the VIN) as discussed above. The participant identification module 436 may retrieve the contact information for an individual associated with the parked vehicle 402 (e.g., an email address, a cellular phone number, etc.) and provide a collision notification message to that individual (step 1124). In some example implementations, the CRM 406 may be configured to transmit the collision notification message directly to the individual associated with the parked vehicle 402. The CRM 406 may store and retain the contact information for the individual and utilize this contact information to contact the individual directly in response to detecting a collision at the vehicle 402. The insurance application 456 at the mobile computing device 404 of the individual may receive and display the collision notification message. In response to receipt of the collision notification message, the individual may return to the vehicle 402 in order to assess any damage, engage with the at-fault participant to exchange insurance information, and initiate insurance claims.

In some example implementations, receipt of the collision notification message at the insurance management system 400 may trigger automatic identification of the participants involved in the collision (step 1126), automatic selection of one of the participants as the at-fault participant (step 1128), and automatic claims processing for insurance claims associated with the collision (step 1130), e.g., an insurance claim against the at-fault participant. The participant identification module 436 of the insurance management system 400 may be configured to identify the at-fault participant that collided with the parked vehicle 402. If the vehicle associated with the at-fault participant is also configured to communicate with an insurance management system (e.g., insurance management system 400 or 458) as described above, then the participant identification module 436 may identify the at-fault participant based on a collision notification message or vehicle telematics data received from the vehicle associated with the at-fault participant.

The participant identification module 436 may also be configured to identify the at-fault participant based on the recording obtained by the parked vehicle 402. As an example, the parked vehicle 402 may provide the recording obtained after the collision occurred to the insurance management system 400, and the insurance management system may process the recording to extract information identifying the vehicle that collided with the parked vehicle. The participant identification module 436 may, for example, employ various image-processing techniques to extract the license plate number of the vehicle and query a third-party system 468 for information identifying the individual associated with the vehicle. Having identified the participant associated with the moving vehicle, the fault determination module 438 of the insurance management system 400 may select the individual associated with the colliding vehicle as the at-fault participant. The claims processing module 442 may thus automatically file an insurance claim against the at-fault participant.

In some example implementations, the disclosures described above may be employed to distinguish between prior damage to the parked vehicle and current damage to the parked vehicle caused by the collision. For example, the insurance management system 400 may be employed to identify prior damage to a vehicle that did not occur as a result of a recent collision. As an example, the vehicle sensors may indicate that damage to the right front bumper occurred prior to the collision (e.g., using timestamp information associated with sensor readings). If the recent collision resulted in damage to the left front bumper, then the insurance management system may thus determine that only the damage to the left front bumper was due to the collision with the damage to the right front bumper being prior damage. The insurance management system may also employ the sensor readings to determine the likelihood of damage caused by a collision. For example, if the vehicle sensors detect a low velocity impact at the rear of the vehicle such that the vehicle moved forward without backward recoil, then the insurance management system may determine that no impact occurred at the front of the vehicle. As a result, the insurance management system may determine that any damage at the front of the vehicle is not due to the recent collision. It will be recognized that the insurance management module may be configured to identify current damage from previous damage in additional or alternative situations.

In further example implementations, the disclosures described above may be employed to detect fraud. Because the insurance management system 400 may be configured to distinguish current damage from previous damage as described above, the insurance management system may also be able to detect attempts at fraud. For example, if an individual claims previous damage as current damage, the insurance management system may flag the claim as fraudulent. As another example, if the velocity information provided by the vehicle do not correlate with the amount of damage claimed by the individual, then the insurance management system may also flag the claim as fraudulent. It will be recognized that the information received from the vehicle may be employed by the insurance management system to identify additional or alternative types of fraudulent activities.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, aspects of the described implementation include software but aspects of the present disclosure may be implemented as a combination of hardware and software or in hardware alone. Additionally, although aspects of the present disclosure are described as being stored in memory, one skilled in the art will appreciate that these aspects can also be stored on other types of non-transitory computer-readable media, such as secondary storage devices, like hard disks, floppy disks, or CD-ROM or other forms of RAM or ROM.

What is claimed is:

1. A computer-implemented method for automatically responding to a collision event comprising:
   storing, at a data store of a computing device, one or more fault determination rules;
   receiving, at the computing device from a first vehicle, one or more first communications comprising first vehicle telematics data generated by the first vehicle during operation of the first vehicle, wherein the first vehicle telematics data is generated, in part, by a multiple-axis accelerometer within the first vehicle;
   receiving, at the computing device from a second vehicle, one or more second communications comprising second vehicle telematics data generated by the second vehicle during operation of the second vehicle, wherein the second vehicle telematics data is generated, in part, by a multiple-axis accelerometer within the second vehicle;
   repeatedly analyzing, automatically by the computing device, the first vehicle telematics data until determining that a collision involving the first vehicle has occurred determining that a collision involving the first vehicle has occurred including detecting a change in velocity of the first vehicle within a predefined time period;
   in response to determining that the collision involving the first vehicle has occurred,
      creating a new collision record in a data store;
      activating one or more recording devices to record an area surrounding the first vehicle;
      identifying, automatically by the computing device, a first participant involved in the collision based, at least in part, on the first vehicle telematics data, and
      determining, automatically by the computing device, whether the second vehicle was involved in the collision based on the second vehicle telematics data; and
   in response to determining that the second vehicle was involved in the collision,
      identifying, automatically by the computing device, a second participant involved in the collision based, at least in part, on the second vehicle telematics data,
      analyzing, automatically by the computing device, the first and second vehicle telematics data according to at least one of the one or more fault determination rules;
      selecting, automatically by the computing device, one of the first or second participants as an at-fault participant based, at least in part, on the at least one fault determination rule; and
      transmitting, to one of first or second participants, a message comprising an identification of the at-fault participant.

2. The method of claim 1 wherein the one or more first communications are received from communication equipment installed at the first vehicle.

3. The method of claim 1 wherein the one or more first communications are received from a communication equipment attached to a diagnostics port of the first vehicle.

4. The method of claim 1 wherein one of the first communications received identifies a current geographic location of the first vehicle and further comprising:
   identifying one or more repair service centers that are located within a predetermined radius of the current geographic location; and
   transmitting, to a communication device associated with an operator of the first vehicle, a communication that includes information that identifies the one or more repair service centers.

5. The method of claim 4 further comprising:
   receiving, from the communication device, a communication that identifies one of the repair service centers selected by the operator.

6. The method of claim 5 wherein the first vehicle telematics data received includes vehicle diagnostic data associated with the first vehicle and further comprising:
   transmitting the vehicle diagnostic data to a communication device associated with the repair service center selected by the operator.

7. The method of claim 4 further comprising:
   indicating, in the communication transmitted to the communication device, that one or more of the repair service centers are preferred repair service centers.

8. The method of claim 7 further comprising:
   providing a reward to the operator in response to receipt of a communication from the communication device that identifies one of the preferred repair service centers selected by the operator.

9. The method of claim 8 wherein the reward is a discount associated with an insurance policy purchased by the operator.

10. The method of claim 1 further comprising:
    transmitting a request to the first vehicle for additional information regarding the collision; and
    receiving, at the computing device from the first vehicle, one or more additional communications that include the additional information regarding the collision.

11. A system for automatically responding to a collision event comprising:

a data store that stores one or more fault determination rules;

one or more processors; and memory storing computer-readable instructions that are executed by at least one of the processors and cause the system to receive, from a first vehicle, one or more first communications comprising first vehicle telematics data generated by the first vehicle during operation of the first vehicle, wherein the first vehicle telematics data is generated, in part, by a multiple-axis accelerometer within the first vehicle, receive, from a second vehicle, one or more second communications comprising second vehicle telematics data generated by the second vehicle during operation of the first vehicle, wherein the second vehicle telematics data is generated, in part, by a multiple-axis accelerometer within the second vehicle, repeatedly analyze the first vehicle telematics data until determining that a collision involving the first vehicle has occurred, determining that a collision involving the first vehicle has occurred including detecting a change in velocity of the first vehicle within a predefined time period;

in response to determining that the collision involving the first vehicle has occurred, create a new collision record in the data store;

activate one or more recording devices to record an area surrounding the first vehicle;

automatically identify a first participant involved in the collision based, at least in part, on the first vehicle telematics data, and automatically determine whether the second vehicle was involved in the collision based on the second vehicle telematics data; and in response to determining that the second vehicle was involved in the collision, automatically identify a second participant involved in the collision based, at least in part, on the second vehicle telematics data, automatically analyze the first and second vehicle telematics data according to at least one of the one or more fault determination rules, automatically select one of the first or second participants as an at-fault participant based, at least in part, on one or more of the fault determination rules and the first and second vehicle telematics data received, and transmit, to one of the first or second participants, a message comprising an identification of the at-fault participant.

12. The system of claim 11 wherein the one or more first communications are received from a communications module installed at the first vehicle.

13. The system of claim 11 wherein the one or more first communications are received from a communications module attached to a diagnostics port of the first vehicle.

14. The system of claim 11 wherein:

one of the first communications received identifies a current geographic location of the first vehicle; and the instructions, when executed by the one or more processors, further cause the system to:

identify one or more repair service centers that are located within a predetermined radius of the current geographic location, and transmit, to a communication device associated with an operator of the first vehicle, a communication that includes information that identifies the one or more repair service centers.

15. The system of claim 14 wherein:

the instructions are executed by at least one of the processors and further cause the system to receive, from the communication device, a communication that identifies one of the repair service centers selected by the operator.

16. The system of claim 15 wherein:

the first vehicle telematics data received includes vehicle diagnostic data associated with the first vehicle; and the instructions are executed by at least one of the processors and further cause the system to transmit the vehicle diagnostic data to a communication device associated with the repair service center selected by the operator.

17. The system of claim 14 wherein:

the instructions are executed by at least one of the processors and further cause the system to indicate that one or more of the repair services centers are preferred repair service centers.

18. The system of claim 17 wherein a reward is provided to the operator in response to receipt at the system of a communication from the communication device that identifies one of the preferred repair service centers selected by the operator.

19. The system of claim 18 wherein the reward is a discount associated with an insurance policy purchased by the operator.

20. The system of claim 11 wherein:

the instructions are executed by at least one of the processors and further cause the system to transmit a request to the first vehicle for additional information regarding the collision, and receive, at the computing device from the first vehicle, one or more additional communications that include the additional information regarding the collision.

* * * * *